US012617682B2

(12) United States Patent
Ly et al.

(10) Patent No.: US 12,617,682 B2
(45) Date of Patent: May 5, 2026

(54) DIRECT SYNTHESIS OF IMPROVED SUPERHYDROPHOBIC CARBON NITRIDE CO-PRODUCTS, AND IMPROVED SUPERHYDROPPBIC CARBON NITRIDE CO-PRODUCTS THEREOF

(71) Applicant: City University of Hong Kong, Hong Kong (HK)

(72) Inventors: Thuc Hue Ly, Hong Kong (HK); Quoc Huy Thi, Hong Kong (HK); Ping Man, Hong Kong (HK)

(73) Assignee: City Univerty of Hong Kong, Hong Kong (HK)

( * ) Notice: Subject to any disclaimer, the term of this patent is extended or adjusted under 35 U.S.C. 154(b) by 469 days.

(21) Appl. No.: 18/321,845

(22) Filed: May 23, 2023

(65) Prior Publication Data

US 2024/0391773 A1     Nov. 28, 2024

(51) Int. Cl.
| | |
|---|---|
| *C01B 21/06* | (2006.01) |
| *B01J 27/24* | (2006.01) |
| *B01J 35/39* | (2024.01) |

(52) U.S. Cl.
CPC ........... *C01B 21/0605* (2013.01); *B01J 27/24* (2013.01); *B01J 35/39* (2024.01); *C01P 2002/20* (2013.01);
(Continued)

(58) Field of Classification Search
CPC ....... C01B 21/0605; B01J 27/24; B01J 35/39; C01P 2002/20; C01P 2002/72; C01P 2002/82; C01P 2002/85; C01P 2002/88; C01P 2004/02; C01P 2004/03; C01P 2004/04; C01P 2006/20
See application file for complete search history.

(56) References Cited

U.S. PATENT DOCUMENTS

2015/0352539 A1* 12/2015 Miyajima ............. H01M 4/587
204/157.52

FOREIGN PATENT DOCUMENTS

WO     2020/139601 A1     7/2020

OTHER PUBLICATIONS

Thi, et al., Superhydrophobic 2D Carbon Nitrides Prepared by Direct Chemical Vapor Deposition, Small Sci. 2023; 3: 2200099, pp. 1-8 with Supporting Information (Year: 2023).*
(Continued)

*Primary Examiner* — Daniel C. Mccracken
(74) *Attorney, Agent, or Firm* — Melvin Li; Heslin Rothenberg Farley & Mesiti P.C.

(57) ABSTRACT

The present invention is concerned with a method of direct synthesis of co-products of at a first co-product and a second co-product. The first co-product is superhydrophilic carbon nitride thin film and the second co-product is superhydrophilic carbon nitride powder. The method has a step of using a guanidine carbonate salt as a precursor material. The present invention is also concerned with carbon nitride co-products. The carbon nitride co-products has a first co-product of superhydrophilic carbon nitride thin film and a second co-product of superhydrophilic carbon nitride powder. The superhydrophilic carbon nitride thin film has chemical formula of $CN_x$, wherein x is 0.86-1.04, and the superhydrophilic carbon nitride powder has a chemical formula of $g-C_3N_4$.

19 Claims, 18 Drawing Sheets
(13 of 18 Drawing Sheet(s) Filed in Color)

(52) U.S. Cl.
    CPC ...... *C01P 2002/72* (2013.01); *C01P 2002/82*
            (2013.01); *C01P 2002/85* (2013.01); *C01P*
            *2002/88* (2013.01); *C01P 2004/02* (2013.01);
                *C01P 2004/03* (2013.01); *C01P 2004/04*
                    (2013.01); *C01P 2006/20* (2013.01)

(56)                References Cited

OTHER PUBLICATIONS

Wang, et al., A metal-free polymeric photocatalyst for hydrogen production from water under visible light, Nature Materials, Published Online: Nov. 9, 2008 DOI: 10.1038/NMAT2317, vol. 8 www.nature.com/naturematerials Jan. 2009.

Zhu, et al., Defect-rich ultrathin poly-heptazine-imide-framework nanosheets with alkali-io doping for photocatalytic solar hydrogen and selective benzylamine oxidation, Nano Research, 15(10), pp. 8760-8770, ISSN 1998-0124 CN11-5974/04 , https://doi.org/10.1007/s12274-022-4519-8 2022.

Liu, et al., Graphitic carbon nitride "reloaded": emerging applications beyond (photo)catalysis, Royal Society of Chemistry, vol. 45, pp. 2308-2326 2016.

Ramsey, et al., Hydrophobic CNx thin ®Im growth by inductively-coupled RF plasma enhanced pulsed laser deposition, Elsevier, Thin Solid Films, vol. 360, pp. 82-88 2000.

Jurgens, et al., Melem (2,5,8-Triamino-tri-s-triazine), an Important Intermediate during Condensation of Melamine Rings to Graphitic Carbon Nitride: Synthesis, Structure Determination by X-ray Powder Diffractometry, Solid-State NMR, and Theoretical Studies, JACS Articles, published on web, vol. 125, pp. 10288-10300 2003.

Liu, et al., Nature-inspired superwettability systems, Nature Reviews Materials, vol. 2, Article No. 17036 2017.

Kouvetakis, et al., Novel Synthetic Routes to Carbon-Nitrogen Thin Films, Chem. Mater. vol. 6, pp. 811-814 1994.

Wang, et al., A metal-free polymeric photocatalyst for hydrogen production from water under visible light, Nature Materials, Published Online: Nov. 9, 2008 DOI: 10.1038/NMAT2317, vol. 8, Jan. 2009.

Lin, et al., Molecular-level insights on the reactive facet of carbon nitride single crystals photocatalysing overall water splitting, Nature Cataly sis | vol. 3 | pp. 649-655 | www.nature.com/natcatal Aug. 2020.

Liu, et al., Graphitic carbon nitride "reloaded": emerging applications beyond (photo)catalysis, Royal Society of Chemistry, vol. 45, 2308-2326 2016.

Wen, et al., Design and Synthesis of Ni-MOF/CNTs Composites and rGO/Carbon Nitride Composites for an Asymmetric Supercapacitor with High Energy and Power Density, Royal Soceity of Chemistry, DOI: 10.1039/C5TA02461G 2015.

Boruah, et al., Photo-Rechargeable Zinc-Ion Capacitor Using 2D Graphitic Carbon Nitride, American Chemical Society, ACS Publications, https://dx.doi.org/10.1021/acs.nanolett.0c01958 Nano Lett. vol. 20, pp. 5967-5974 2020.

Foglia, et al., Aquaporin-like water transport in nanoporous crystalline layered carbon nitride, Sci. Adv., vol. 6 : eabb6011 Sep. 25, 2020.

Li, et al., Graphitic carbon nitride (g-C3N4) nanosheets functionalized composite membrane with self-cleaning and antibacterial performance, Elsevier, Journal of Hazardous Materials, vol. 365, pp. 06-614 2019.

Ragupathi, et al., Bandgap engineering in graphitic carbon nitride: Effect of precursors, Elsevier, vol. 202, ,Optik International Journal for Light and Electron Optics 2020.

Qi, et al., Two-dimensional graphyne-like carbon nitrides: Moderate band gaps, high carrier mobility, high flexibility and type-II band alignment, Elsevier, Carbon, vol. 149, pp. 234-241 2019.

Huang, et al., In situ textured carbon nitride photoanodes with enhanced photoelectrochemical activity by bandgap state modulation, Royal Society of Chemistry, DOI: 10.1039/d0ta06550a Oct. 20, 2020.

Khanis, et al., Investigations on the Role of N2:(N2 + CH4) Ratio on the Growth of Hydrophobic Nanostructured Hydrogenated Carbon Nitride Thin Films by Plasma Enhanced Chemical Vapor Deposition at Low Temperature, Materials, vol. 10, p. 102; doi:10.3390/ma10020102 2017.

Bu, et al., Using electrochemical methods to study the promotion mechanism ofthe photoelectric conversion performance of Ag-modifiedmesoporous g-C3N4heterojunction material, Elsevier, Applied Catalysts, vol. 144, pp. 622-630 2014.

Liu, et al., Nature-inspired superwettability systems, Nature Review materials, vol. 2 | Article No. 17036 2017.

Son, et al., A practical superhydrophilic selfcleaning and anti reflective surface for outdoor photovoltaic applications, Elsevier, Solar Energy Materials & Solar Cells, vol. 98, pp. 46-51 2012.

Huang, et al., Cation-controlled wetting properties of vermiculite membranes and its promise for fouling resistant oil-water separation, Nature Communications, https://doi.org/10.1038/s41467-020-14854-4, 2020.

Maguire-Boyle, et al., Superhydrophilic Functionalization of Microfiltration Ceramic Membranes Enables Separation of Hydrocarbons from Frac and Produced Water, Scientific Reports , vol. 7: 12267, DOI:10.1038/s41598-017-12499-w Sep. 25, 2017.

Cha, et al., Hydrophilic surface modification of TiO2 to produce a highly sustainable photocatalyst for outdoor air purification, Elsevier, Applied Surface Science, 2019.

Hyun Park, et al., Insight into the Critical Role of Surface Hydrophilicity for Dendrite-Free Zinc Metal Anodes, ACS Publications, ACS Energy Letters, vol. 6, pp. 3078-3085 2021.

Kim, et al., Sprout-shaped Mo-doped CoP with maximized hydrophilicity and gas bubble release for high-performance water splitting catalyst, Chemical Engineering Journal, vol. 408 2021.

Zang, et al., Multifunctionality and control of the crumpling and unfolding of large-area graphene, Nature Materials, vol. 12, Apr. 2013.

Geng, et al., Unidirectional water delivery on a superhydrophilic surface with two-dimensional asymmetrical wettability barriers, Royal Society of Chemistry, Materials Horizon, vol. 5, pp. 303-308 2018.

Chen, et al., Hexagonal Boron Nitride as a Multifunctional Support for Engineering Efficient Electrocatalysts toward the Oxygen Reduction Reaction, ACS Publications, Nano Letters, vol. 20, pp. 6807-6814 2020.

Kamal, et al., Wetting behaviour of carbon nitride nanostructures grown by plasma enhanced chemical vapour deposition technique, Elsevier, Applied Surface Science, vol. 328, pp. 146-153 2015.

Jurgens, et al., Melem (2,5,8-Triamino-tri-s-triazine), an Important Intermediate during Condensation of Melamine Rings to Graphitic Carbon Nitride: Synthesis, Structure Determination by X-ray Powder Diffractometry, Solid-State NMR, and Theoretical Studies, American Chemical Society, vol. 125, pp. 10288-10300 2003.

Sandoval Rangel, et al., Pyrolysis of urea and guanidinium salts to be used as ammonia precursors for selective catalytic reduction of NOx, Elsevier, Journal of Analytical and Applied Pyrolysis, 2015.

Wenzel, Resistance of Solid Surfaces to Wetting by Water, Industrial and Engineering Chemistry, vol. 8, No. 28 Aug. 1936.

Eral, et al., Contact angle hysteresis: a review of fundamentals and applications, Colloid Polym Sci (2013) 291:247-260 2013.

Cassie, et al., Wettability of Porous Surfaces, Journal Homepage, Jan. 1944.

Fina, et al., Structural Investigation of Graphitic Carbon Nitride via XRD and Neutron Diffraction, ACS Publications, Chemistry of Materials, vol. 27, pp. 2612-2618 Mar. 2015.

Kroke, et al., Tri-s-triazine derivatives. Part I. From trichloro-tri-s-triazine to graphitic C3N4 structures, New J. Chem., vol. 26, pp. 508-512 2002.

Lou, et al., Janus MoPC Monolayer with Superior Electrocatalytic Performance for the Hydrogen Evolution Reaction, American Chemical Society, ACS Publications, vol. 14, pp. 7836-7844 2022.

Huang, et al., Unraveling fundamental active units in carbon nitride for photocatalytic oxidation reactions, Nature Communications, vol. 12:320 2021.

(56) References Cited

OTHER PUBLICATIONS

Deng, et al., Graphene Wrinkles Enable Spatially Defined Chemistry, American Chemical Society, ACS Publications, Nano Letters, vol. 19, pp. 5640-5646 2019.

Zhou, et al., Control over the wettability of amorphous carbon films in a large range from hydrophilicity to super-hydrophobicity, Elsevier, Applied Surface Science, vol. 253, pp. 2690-2694 2006.

Feldermann, et al., Carbon nitride deposited using energetic species: a review on XPS studies, The American Physical Society, vol. 8, No. 4, Jul. 15, 1998.

Shinde, et al., Electrocatalytic hydrogen evolution using graphitic carbon nitride coupled with nanoporous graphene co-doped by S and Se, Royal Society of Chemistry, Journal of Materials Chemistry A, pp. 1-10 2015.

Guy, Directional transfer of photocarriers on CdS/g-C3N4 heterojunction modified with Pd as a cocatalyst for synergistically enhanced photocatalytic hydrogen production, Elsevier, Applied Surface Science, vol. 522 2020.

Keun Kim, et al., Impact of Surface Hydrophilicity on Electrochemical Water Splitting, American Chemical Society, ACS Publications, Applied Materials & Interfaces, vol. 13, pp. 11940-111947 2021.

Shirley, High-Resolution X-Ray Photoemission Spectrum of the Valence Bands of Gold, Magnetoplasma Surface Waves in Metals, vol. 5, No. 12, Jun. 15, 1972.

Drelich, J. et al. "Hydrophilic and superhydrophilic surfaces and materials", Soft Matter, Jun. 22, 2011, pp. 9804-9828.

Tadanaga, K. et al. "Superhydrophobic-Superhydrophilic Micropatterning on Flowerlike Alumina Coating Film by the Sol-Gel Method", Chemical Materials, Feb. 12, 2000, pp. 590-592, vol. 12, No. 3.

* cited by examiner

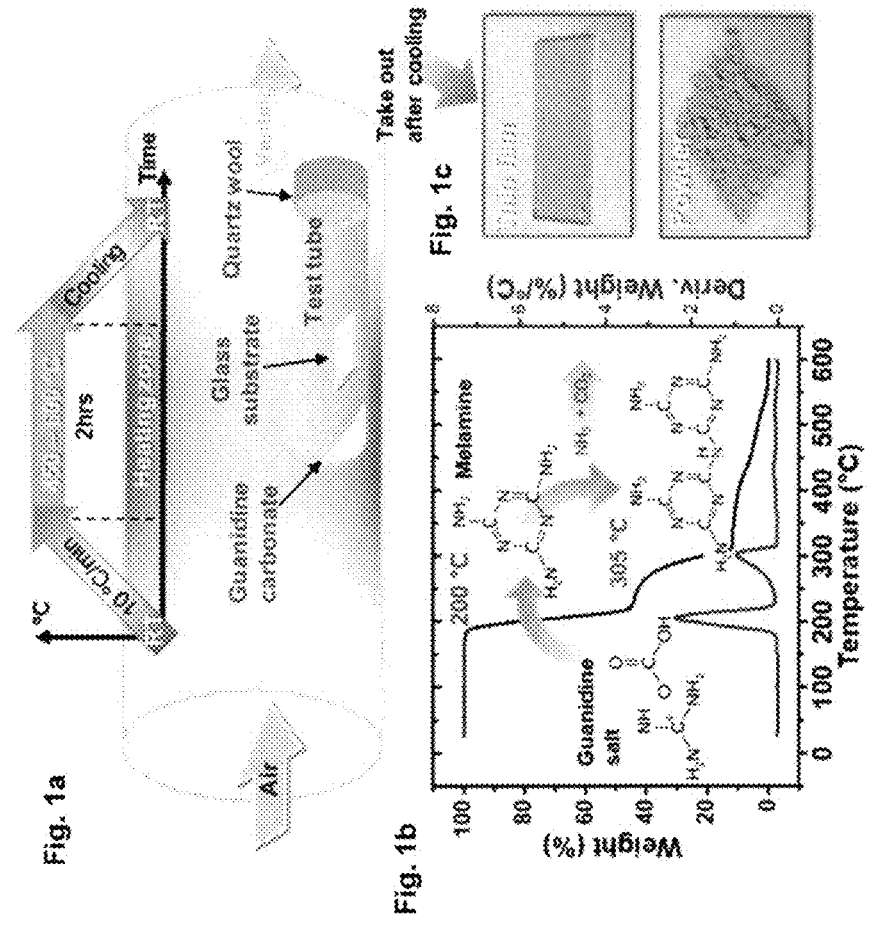

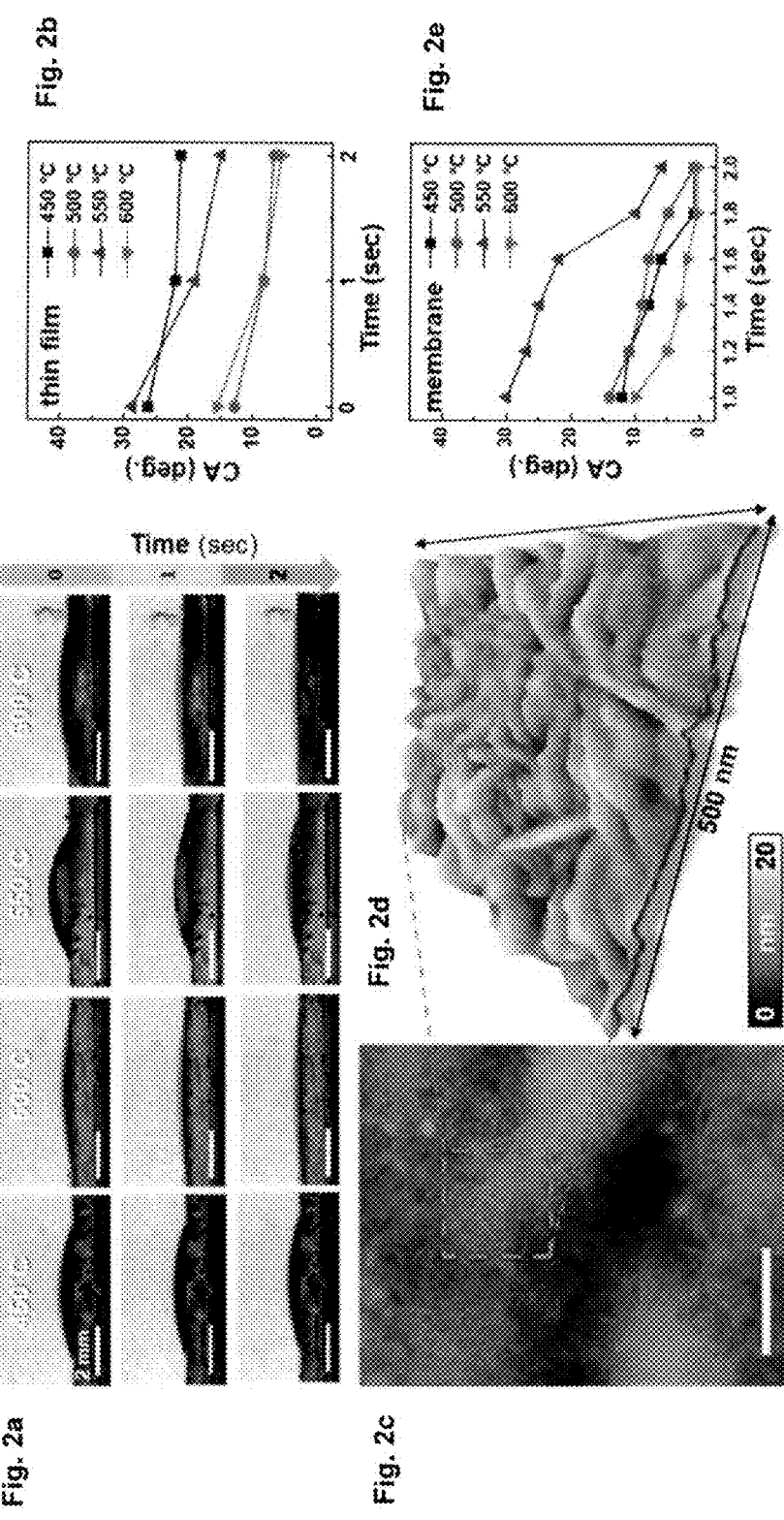

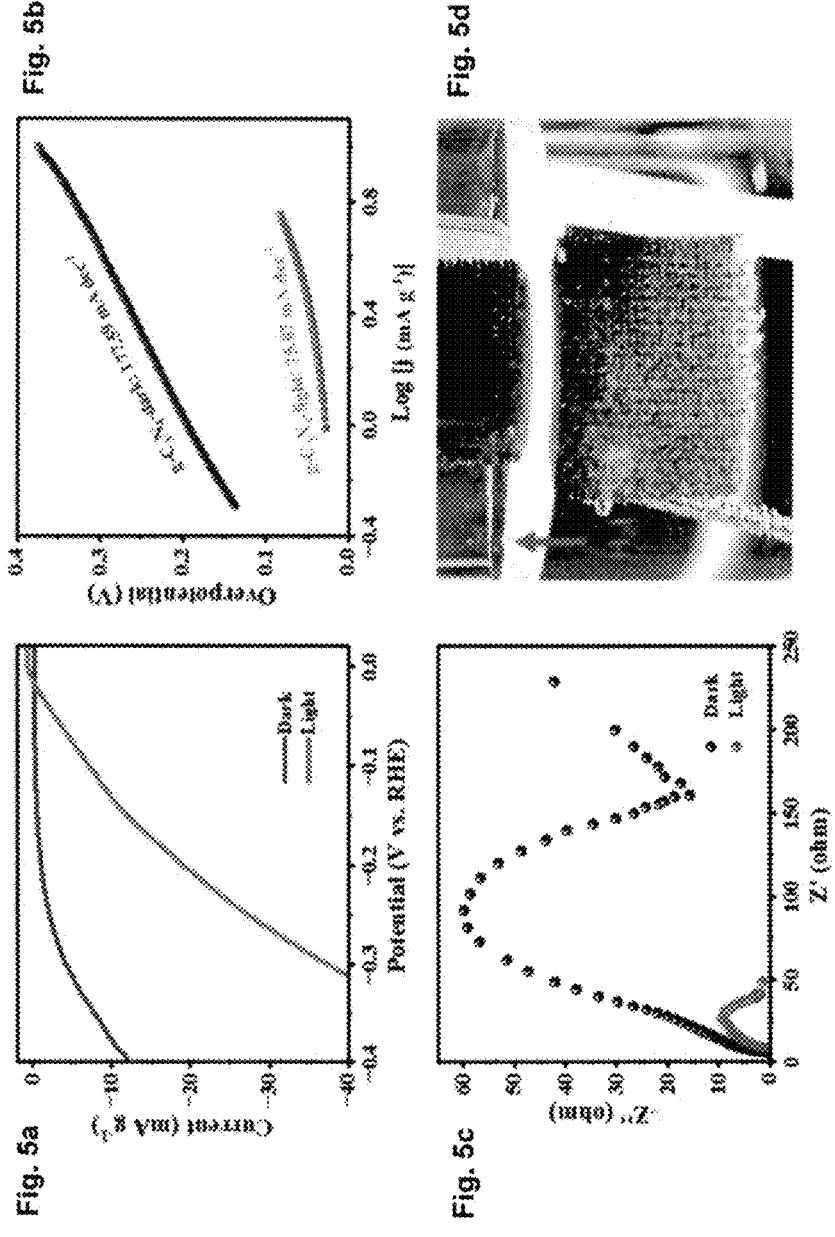

PTFE membrane

Filtration & dry

Sonication for 1hr 37 kHz
80% power 10 mg powder samples 10 mL Dimethylformamide (DMF)

Triazine

Heptazine

DIRECT SYNTHESIS OF IMPROVED SUPERHYDROPHOBIC CARBON NITRIDE CO-PRODUCTS, AND IMPROVED SUPERHYDROPPBIC CARBON NITRIDE CO-PRODUCTS THEREOF

FIELD OF THE INVENTION

The present invention is concerned with a method of direct synthesis of superhydrophilic carbon nitride co-products, and superhydrophilic carbon nitride co-products thereof.

BACKGROUND OF THE INVENTION

The following discussion of the background art is intended to facilitate an understanding of the present invention only. It should be appreciated that the discussion is not an acknowledgement or admission that any of the material referred to was part of the common general knowledge as at the priority date of the application.

Carbon nitride ($CN_x$) type materials are can be used as metal-free photocatalysts for water splitting, energy storage and water filtration membranes. Their prolific allotropes with rich surface properties offers a high flexibility in structural and property modification, e.g., bandgap modulations by surface functionalization or carbon/nitrogen (C/N) ratio. However, the rich allotropes make it difficult to directly modify the properties during synthesis process, as a little change may lead to varied and unpredictable products. Meanwhile, the functionalization could be realized by second-time growth or post-treatment to convert the common structure like graphitic carbon nitrides ($g-C_3N_4$) to the desired structures, however, with long processing time, high production loss and inevitable hazardous chemical usage.

Unfortunately, most of the conventional carbon-based materials such as graphene and its analogous are hydrophobic owing to their large inert surfaces. Doping nitrogen to carbon-based structure or implanting oxygen-based functional groups on surfaces can increase the hydrogen bonding between surface and water molecules. Note that the $CN_x$ materials are alternative metal-free photocatalysts with narrow bandgap. Previous literature has reported that contact angle (CA) between water and the ideal condensed $g-C_3N_4$ was 53.5°, meanwhile the two-dimensional (2D) $CN_x$ thin films prepared by bottom-up growth had water wettability of 60° to 80°. The $CN_x$ film could be converted to hydrophobic by increasing surface porosity, resulted from the modification of precursor ratio or the source-substrate distances. However, the superhydrophilic 2D $CN_x$ or $g-C_3N_4$ membranes have not been acquired yet by direct synthesis. Alternatively, the post-synthesis functionalized $CN_x$ surfaces with oxygenated molecules did improve the hydrophilicity, but their CA with water was still over 24°. Moreover, embedding functional groups after synthesis caused unwanted disruptions to the initial lattice structure that significantly reduced their durability.

The carbon nitrides can be simply obtained by doping nitrogen into graphite. Besides, thermal polymerization of melamine ($C_3N_3$ $(NH_2)_3$) or other N-rich compounds like urea ($CN_2OH_4$), cyanamide ($CN_2H_2$) and its dimer (Dicyandiamide, $C_2N_4H_4$) can produce the powder of $g-C_3N_4$. However, these methods cannot control the surface wettability of products directly but required some complicated post-treatments to functionalize the origin surface.

Further, while conventional methodologies may produce carbon nitride membranes, they are not able to achieve this by way of direct synthesis. In fact, while the post-synthesis functionalized $CN_x$ surfaces with oxygenated molecules may improve the hydrophilicity but then it undesirably causes unwanted disruptions to the initial lattice structure that significantly reduces their durability.

The present invention seeks to provide new synthesis method that can spontaneously yield superhydrophilic surface is essential and pressing, or at least to provide alternatives to the public.

SUMMARY OF THE INVENTION

According to a first aspect of the present invention, there is provided a method of direct synthesis of co-products of a first co-product and a second co-product, wherein the first co-product is superhydrophilic carbon nitride thin film and the second co-product is superhydrophilic carbon nitride powder, comprising a step of using a guanidine carbonate salt as a precursor material. Preferably, the superhydrophilic carbon nitride thin film may have a chemical formula of $CN_x$, wherein x is 0.86-1.04, and the superhydrophilic carbon nitride powder has a chemical formula of $g-C_3N_4$. By direct synthesis, it means there is no intermediate steps.

Preferably, the superhydrophilic carbon nitride thin film may have a water contact angle of 0-5°. In an embodiment, the water contact angle may be of 4.5°.

Suitably, the superhydrophilic carbon nitride thin film on its surface may have an oxygen-carbon ratio of 0.01-0.63. In an embodiment, the superhydrophilic carbon nitride thin film on its surface may have an oxygen-carbon ratio of 0.63.

Advantageously, the guanidine carbonate salt may have a chemical formula of $NH_2C(=NH) NH_2·\frac{1}{2}H_2CO_3)$.

In one embodiment, the method may make use of chemical vapor deposition (CVD).

In a preferred embodiment, the method may comprise the steps of i) providing a reaction tube acting as a reaction chamber defining opposite open lateral ends, with one end receiving a flow of gas and the opposite end allowing, after reaction, the flow of gas to exit, wherein the opposite end is filled with a one-way valve for preventing backflow, ii) placing a predetermined amount of the guanidine carbonate salt on the bottom of the reaction tube, iii) providing a growth substrate and putting the growth substrate in the reaction tube such that there is a clearance of 1-5 cm between the growth substrate and the guanidine carbonate salt, iv) subjecting the reaction chamber to heat in a furnace, v) subjecting the reaction chamber to the flow of gas therethrough and allowing the reaction to take place for a predetermined amount of time at a predetermined temperature, and vi) allowing annealing to complete and collecting the first co-product superhydrophilic carbon nitride thin film on the growth substrate and the second co-product superhydrophilic carbon nitride powder at the opposite end of the reaction tube. Preferably, the flow of gas may be dry and consists of nitrogen, oxygen, argon and carbon dioxide; the reaction tube may have a diameter tube of 8-15 cm; the amount of guanidine carbonate salt placed in the reaction tube may be 0.5 g to 1.5 g; the guanidine carbonate salt may be located in the center of the heating zone of the furnace; and the growth substrate is located downstream of the heating zone in the reactive tube. In preferred embodiments, the flow of gas may have a rate in the range of 50 sccm to 200 sccm; and the reaction may take place with an initial ramping time of 30 to 60 min, following by a subsequent annealing time of 1 to 6 hrs at 450-600° C.

According a second aspect of the present invention, there is provided carbon nitride co-products of films and powder, wherein the superhydrophilic carbon nitride thin film has chemical formula of $CN_x$, wherein x is 0.86-1.04, and the superhydrophilic carbon nitride powder has a chemical formula of $g-C_3N_4$.

Preferably, the superhydrophilic carbon nitride thin film may have a water contact angle of 0-5°. Specifically, the water contact angle may be of 4.5°.

Advantageously, the superhydrophilic carbon nitride thin film on its surface may have an oxygen-carbon ratio of 0.01-0.63. Specifically, the oxygen-carbon ratio may be 0.63.

Superhydrophilic $CN_x$ thin film accordance to the present invention can be used as metal-free photocatalyst for hydrogen evolution reaction (HER).

According to a third aspect of the present invention, there is provided a photocatalyst comprising carbon nitride co-products described above, for example, to enhance water splitting.

According to a fourth aspect of the present invention, there is provided a window system providing a window surface coated with carbon nitride co-products described above for facilitating self-cleaning or for allowing photo-catalytic properties.

BRIEF DESCRIPTION TO THE DRAWINGS

The patent or application file contains at least one drawing executed in color. Copies of this patent or patent application publication with color drawing(s) will be provided by the Office upon request and payment of the necessary fee.

Some embodiments of the present invention will now be explained, with reference to the accompanied drawings, in which:

FIGS. 1a to 1c include a schematic diagram, a graph and images showing the synthesis of carbon nitrides, in which FIG. 1a illustrates the experimental setup and the heating process for the carbon nitrides synthesis, FIG. 1b illustrates the thermogravimetric analysis (TGA) for decomposition of guanidine carbonate as precursor and the polycondensation of carbon nitrides during heating process, and FIG. 1c are digital images showing final products of $CN_x$ thin film and powder taken out from CVD synthesis chamber after cooling.

FIGS. 2a to 2e include images and graphs illustrating superhydrophilicity of $CN_x$ thin films and membranes, in which FIG. 2a are images of snapshots series showing evolution of contact angle (CA) between surface of $CN_x$ thin films and water droplet over time [Scale bar=2 mm], FIG. 2b is a graph showing the time-dependent CA of water droplet on surface of $CN_x$ thin films, FIG. 2c is an AFM topographic image of $CN_x$ thin films deposited at 500° C. which contained needle-shaped texture on 2D surface [Scale bar=500 nm], FIG. 2d is an image of the 3D layout of zoom-in area corresponding to the blue square dash-line in FIG. 2c, and FIG. 2e is a graph showing the time-dependent CA of water droplet on surface of membranes made from $CN_x$ powder.

FIGS. 3a to 3c are graphs illustrating crystalline structure and chemical bonding of carbon nitrides powder and thin films, in which FIG. 3a and FIG. 3b show the X-ray diffraction (XRD) spectrum of powder and thin films deposited on glass substrates at different annealing temperature, respectively, with the red lines marked for the peaks of triazine structure and blue dashed line marked for the peaks of heptazine structure, and FIG. 3c shows the fourier-transform infrared (FT-IR) spectrum of powder and thin films deposited on glass substrates at different annealing temperature.

FIG. 4 is a graph showing X-ray photoelectron spectroscopy (XPS) characterizations of $CN_x$ thin films deposited on glass substrate at different annealing temperature. The XPS spectrum peak fitting of carbon 1s core-level (left) and nitrogen 1s core-level (right) of $CN_x$ thin films deposited on glass substrate at 450, 500, 550 and 600° C.

FIGS. 5a to 5d are graphs and an image illustrating photo-electrocatalytic performance of superhydrophilic carbon nitride, in which FIG. 5a shows the polarization curves, FIG. 5b shows the corresponding Tafel slope, and FIG. 5c are nyquist plots of electrochemical impedance spectroscopy of prepared $CN_x@CC$ electrode under dark and light (15 W) condition, and FIG. 5d is a digital picture showing the generation of $H_2$ bubbles on electrode.

FIGS. 6a to 6b illustrate the optimization of substrate position, in which FIG. 6a are digital images and FIG. 6b are optical microscope (OM) images of $CN_x$ thin films deposited on glass substrates dispensed at different locations in the test tube. The sample in position 2 which was 3-5 cm away from precursor shows the cleanest surface and uniform transparent yellow thin film on glass substrate.

FIGS. 7a to 7e are images showing the preparation of membranes from powder sample, in which FIG. 7a are digital pictures of powder samples annealed at different temperature, FIG. 7b shows that about 10 mg of selected powder sample at first was dispersed in 10 mL dimethyl-formamide (DMF), FIG. 7c shows that the vial contained sample solution was put into a sonication bath at 37 kHz-80% power in 1 hrs for well dispersion, and FIG. 7d shows that the solution was then filtrated through a hydrophilic PTFE filter to form a uniform membrane on the filter, and FIG. 7e are pictures showing the membranes were dried thoroughly in oven at 60° C. for further measurement.

Figures 9A, 9B, 9C, 9D:
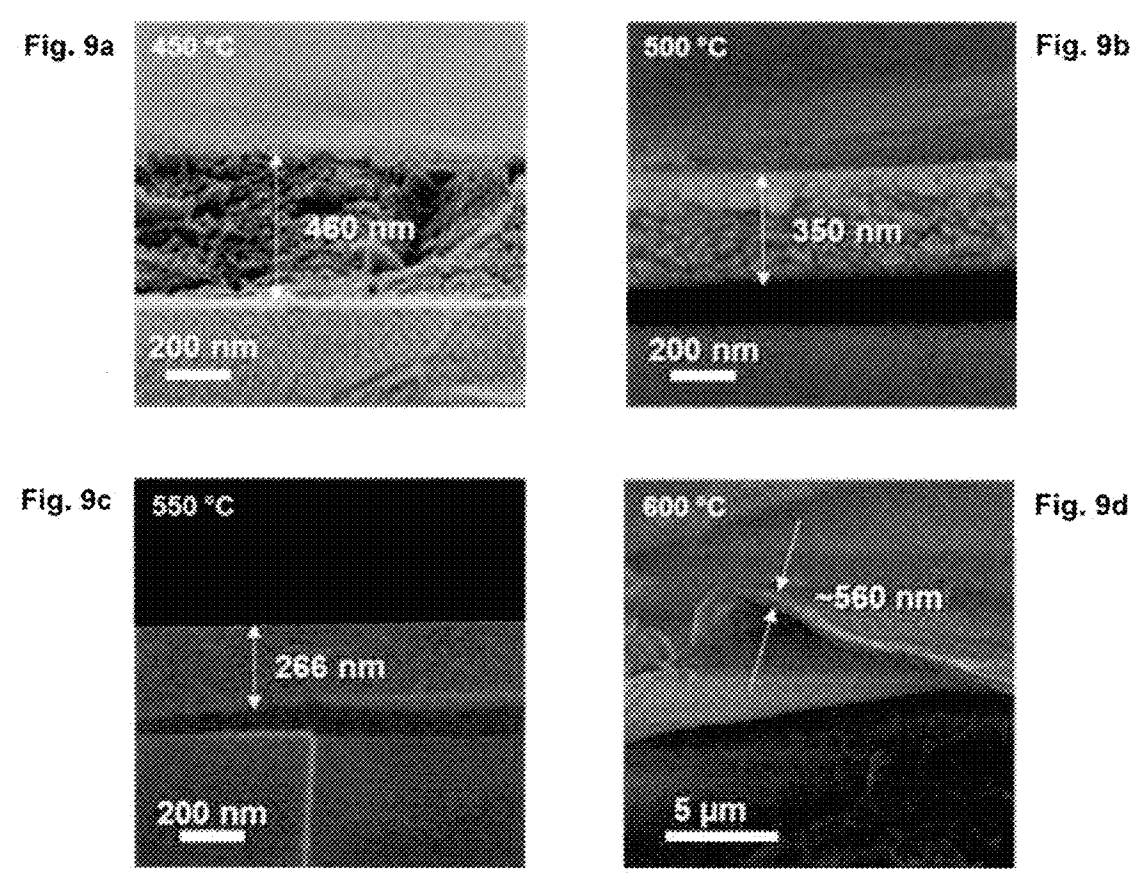

FIGS. 9a to 9d are scanning electron microscope (SEM) images of the cross-sectional morphology of $CN_x$ thin film deposited at 450, 500, 550 and 600° C., respectively.

FIGS. 11a and 11b are the basic unit of graphitic carbon nitrides ($g-C_3N_4$), in which FIG. 11a shows heptazine and FIG. 11b shows triazine.

Figure 12:
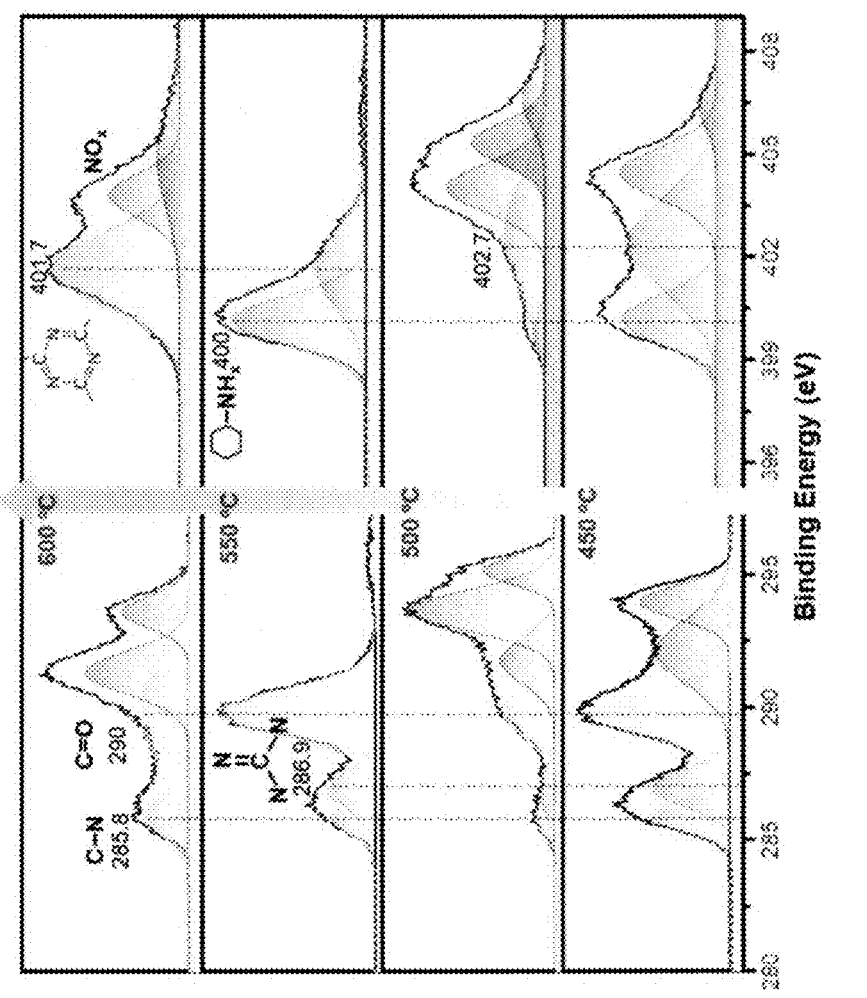

FIG. 12 shows X-ray photoelectron spectroscopy (XPS) characterizations of $g-C_3N_4$ powder sample synthesized at different annealing temperature. The XPS spectrum peak fitting of carbon 1s core-level (left) and nitrogen 1s core-level (right) of $g-C_3N_4$ synthesized at 450, 500, 550 and 600° C.

Figure 13:
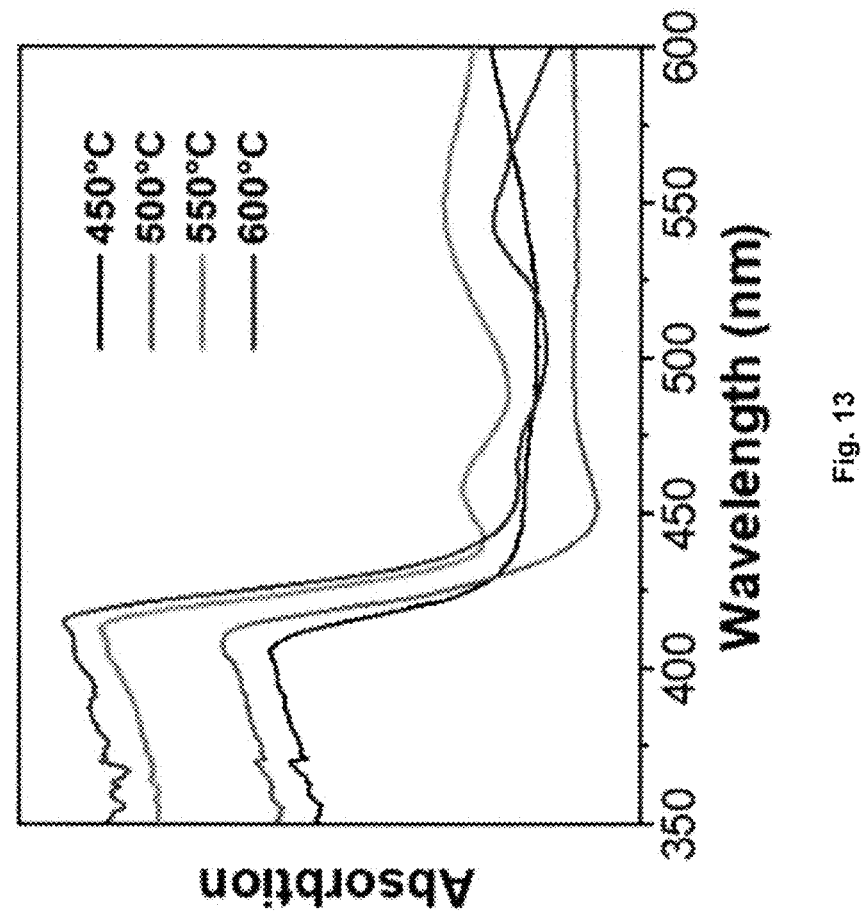
Figures 14A, 14B, 14C, 14D:
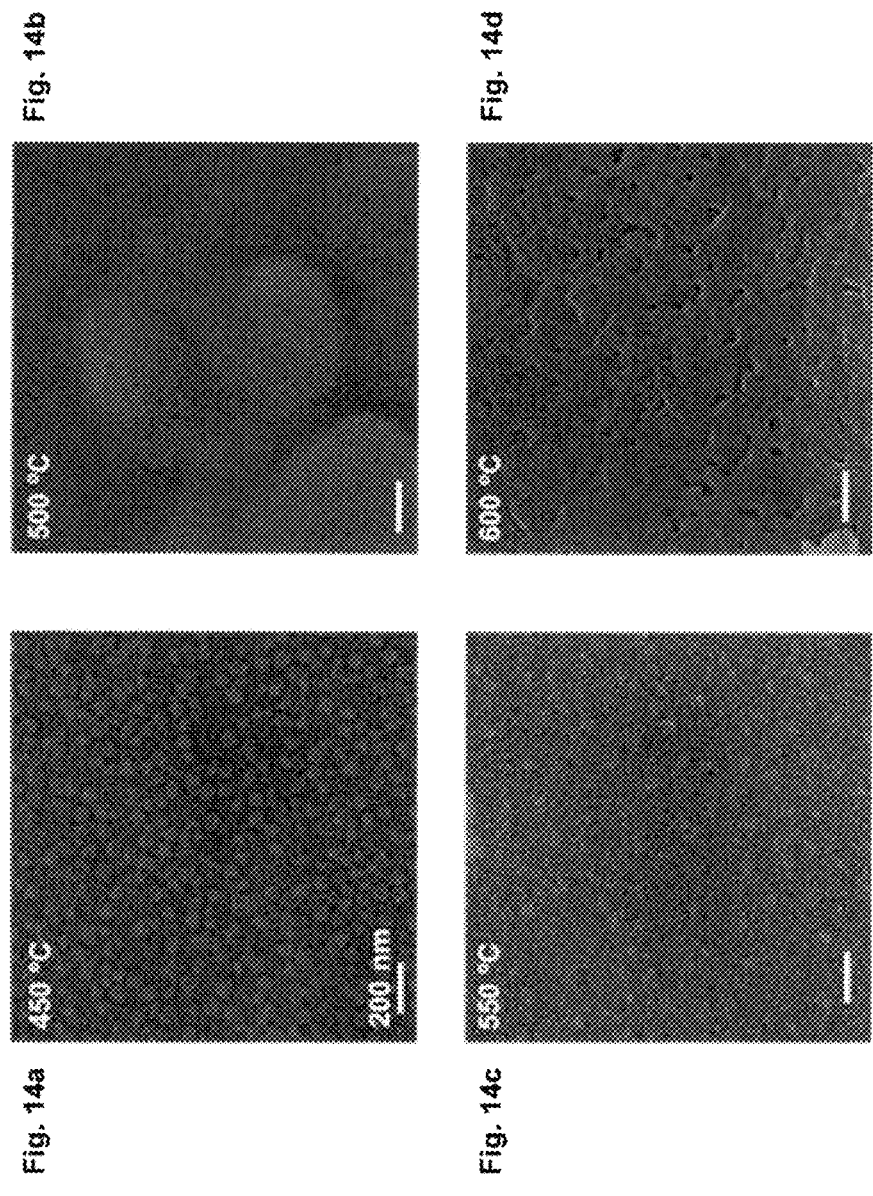

FIG. 13 shows an absorption spectrum of $CN_x$ thin films deposited at different annealing temperature. The absorption edge at 420-440 nm light agreed with the optical bandgap of graphitic structure.

FIGS. 14a to 14d are the top-view SEM images of $CN_x$ thin films deposited on glass substrates at (a) 450° C., (b) 500° C., (c) 550° C. and (d) 600° C., respectively.

Figure 15:
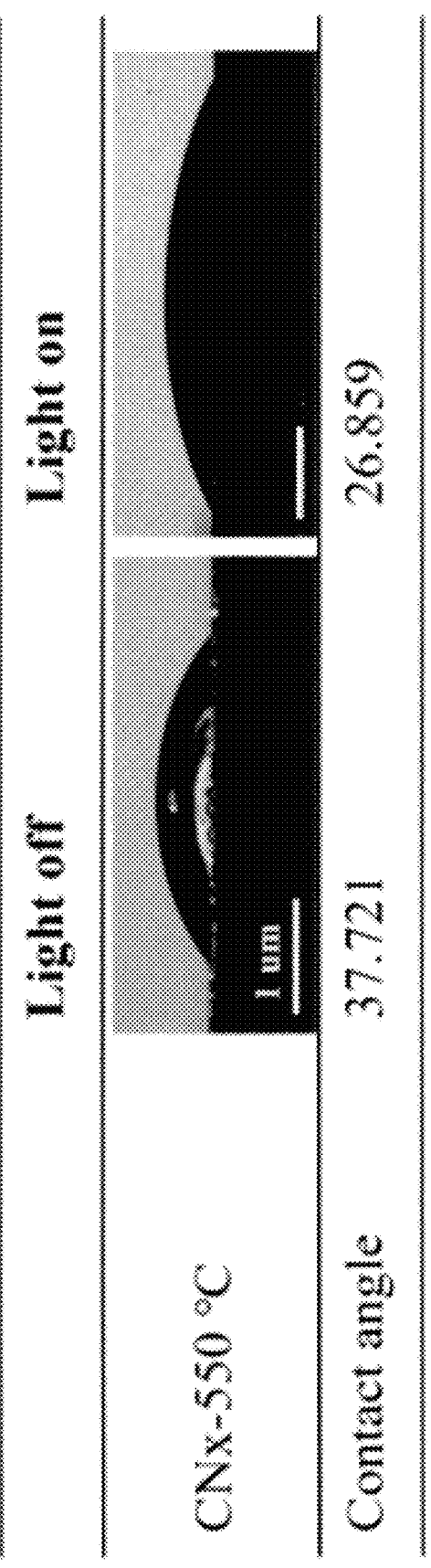

FIG. 15 are images showing hydrophilicity of the sample (550° C. $CN_x$) on glassy carbon electrode without and under light. Scale bar=2 mm. The CA is collected when the droplets make first contact.

Figures 16A, 16B:
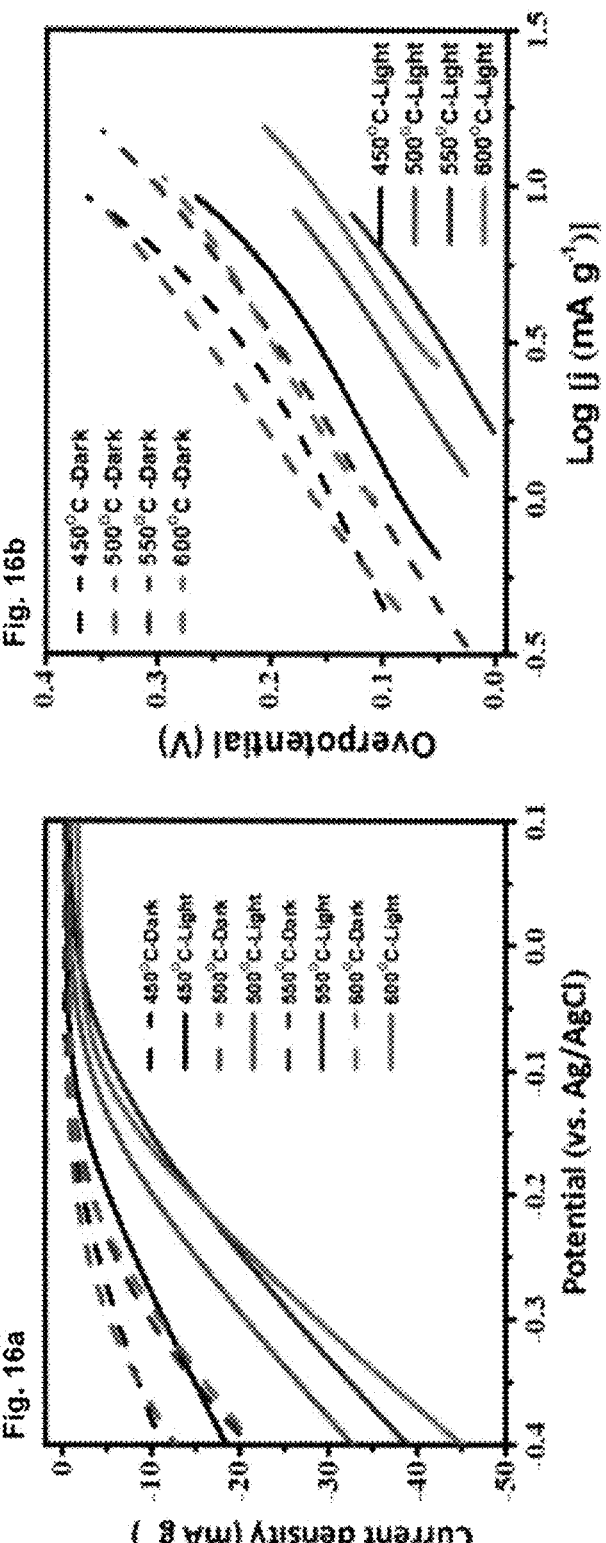

FIGS. 16a to 16b are graphs showing photo-electrocatalytic performance of $CN_x$ sample synthesized at different temperature (450, 500, 550 and 600° C.), in which FIG. 16a illustrates polarization curves and FIG. 16b illustrates corresponding Tafel slope of prepared $CN_x$ @CC electrodes under dark and light (13 W) condition.

Figure 17:
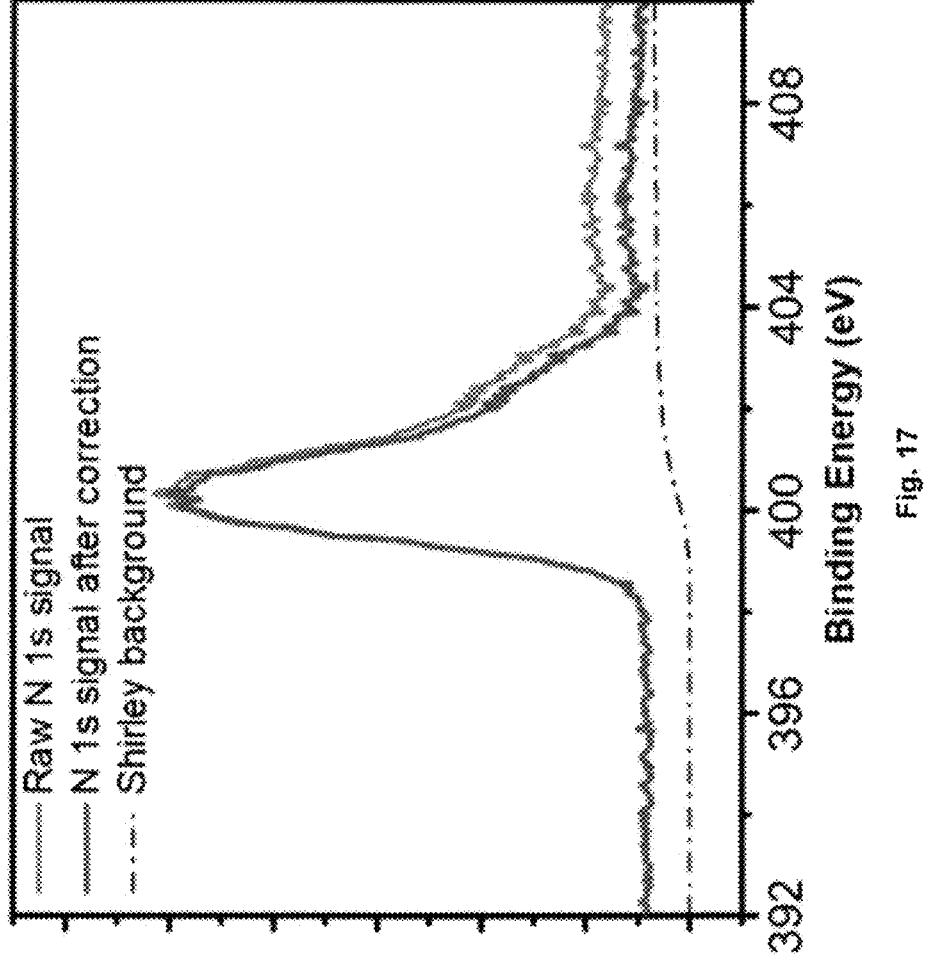

FIG. 17 is a graph showing the XPS signal of N 1s of $g\text{-}C_3N_4$ powder synthesized at 550° C. before and after subtracting the signal from the inelastic scattering of electrons using Shirley method.

Figure 18:
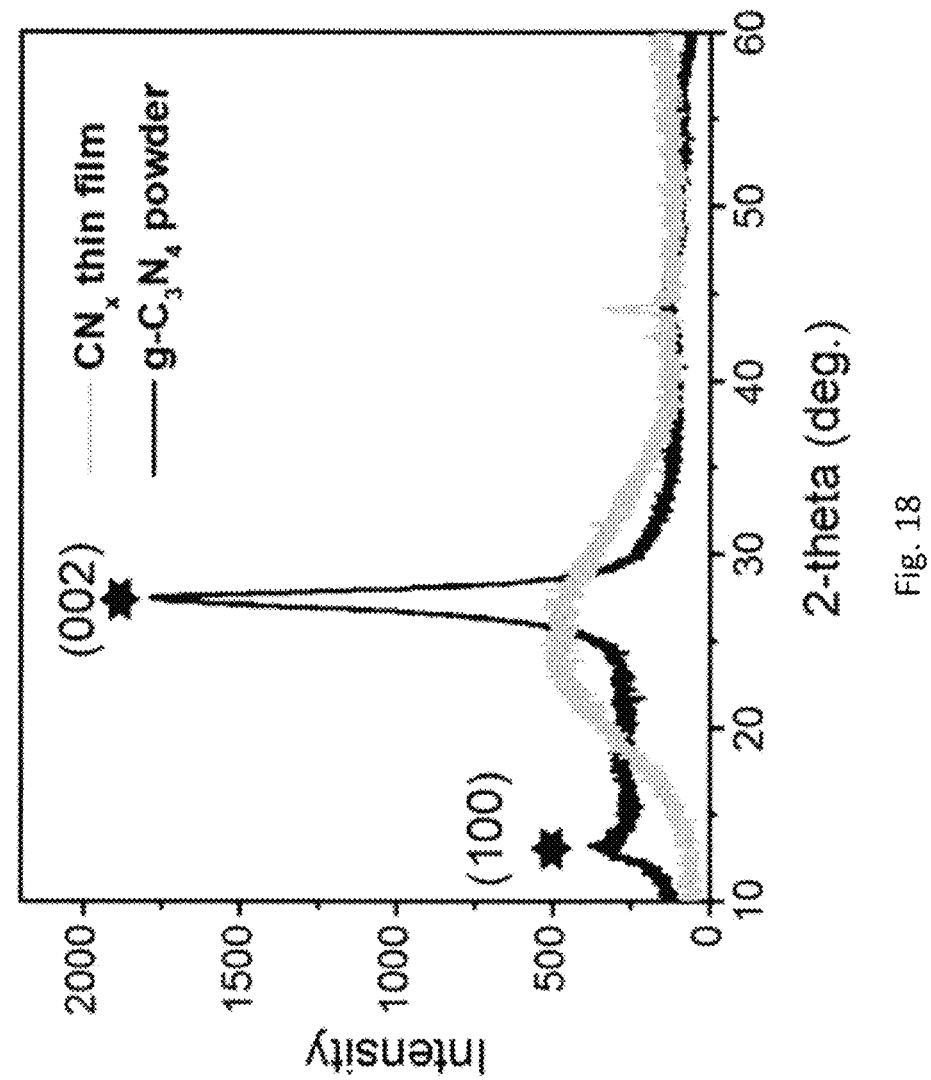

FIG. 18 is a graph of X-ray diffraction showing the carbon nitride thin film and powder.

DETAILED DESCRIPTION OF PREFERRED EMBODIMENTS OF THE INVENTION

Superhydrophilicity benefits many applications working in the water/humid-involved environments, from the self-cleaning outdoor window surfaces to the high performance photocatalysts and membranes. The present invention provides for direct synthesis of superhydrophilic $CN_x$ which can significantly improve the catalytic efficiency of this metal-free photocatalysts and has a profound application prospect in the field of photocatalysis and photo-electrocatalysis.

In existing technologies, superhydrophilicity carbon nitrides can be achieved by using strong acids or bases to functionalize the surface. Another way is using plasma treatment for embedding O-based functional groups which has strong polarization toward water molecules. However, these methods always cause serial damage to the original surface and degrade the durability of the materials. Meanwhile, most of superhydrophilic coatings are polymers without photocatalytic behavior.

The present invention for direct synthesis of superhydrophilic carbon nitrides exempts all chemical waste and cost in post-treatment processes in achieve superhydrophilicity on surface of a metal-free photocatalyst material, as well as shorten the preparation time and yield the manufacturing efficiency. Moreover, this method can directly grow superhydrophilic $CN_x$ thin film on both hydrophilic and hydrophobic substrates. The new superhydrophilic $CN_x$ coating also has potential application in smart window, that surface can own both self-cleaning and photocatalyst function. Experiments leading to the present invention show that superhydrophilic $CN_x$ thin film can be grown directly on different substrate including hydrophilic (glass, FTO glass) and hydrophobic substrate (carbon cloth), and superhydrophilic $CN_x$ powder. The prese invention enables for a large-scale synthesis and improving its photo-electrocatalytic performance.

The present invention discloses a method for direct synthesis of co-products, including superhydrophilic carbon nitride thin films ($CN_x$, x~0.86-1.04) and graphitic carbon nitride powder ($g\text{-}C_3N_4$) using chemical vapor deposition (CVD) and their application for metal-free photocatalyst in hydrogen evolution reaction (HER). The superhydrophilicity is obtainable on different grown substrate and enhance the photo-electrocatalytic of carbon nitride thin films as well. The process uses guanidine carbonate salt as precursor sealed by quartz wool in a test tube with the grown substrate, and then anneals at appropriated temperature with constant dry air supply.

Surface wetting greatly impacts on the performances of many photocatalysts in water/humid-involved medium. Carbon nitrides and its isotopes, as emerging metal-free low cost photocatalysts for water splitting, usually require strong chemical or irradiation treatments to obtain highly hydrophilic surfaces, which can undermine their photocatalytic performances. The present invention has identified an alternative and improved method for the direct synthesis of superhydrophilic carbon nitride thin films ($CN_x$, x~0.86-

1.04) and graphitic carbon nitride powder ($g\text{-}C_3N_4$) by using chemical vapor deposition (CVD). Experiments have shown that less than 5° (or) 1-5° contact angle with water is accessible on both surface of as-grown $CN_x$ thin films and the membranes made from the $g\text{-}C_3N_4$ powder. The present invention has illustrated the remarkable wetting property attributed to the spontaneous hydrophilic functionalization group (e.g., —OH, —$NO_x$, =O) supplied by a constant multi-elemental air flow. The abundant CN triple bonds also promote needle-shaped nanostructures on the 2D surfaces, which enhances their chemical wettability. The present invention with respect the direct synthesis of superhydrophilic carbon nitride can be applied or embodied in photocatalysis applications. Below are further illustrations including experiments, results and discussion concerning the present invention.

Experiments

Figures 6A, 6B:
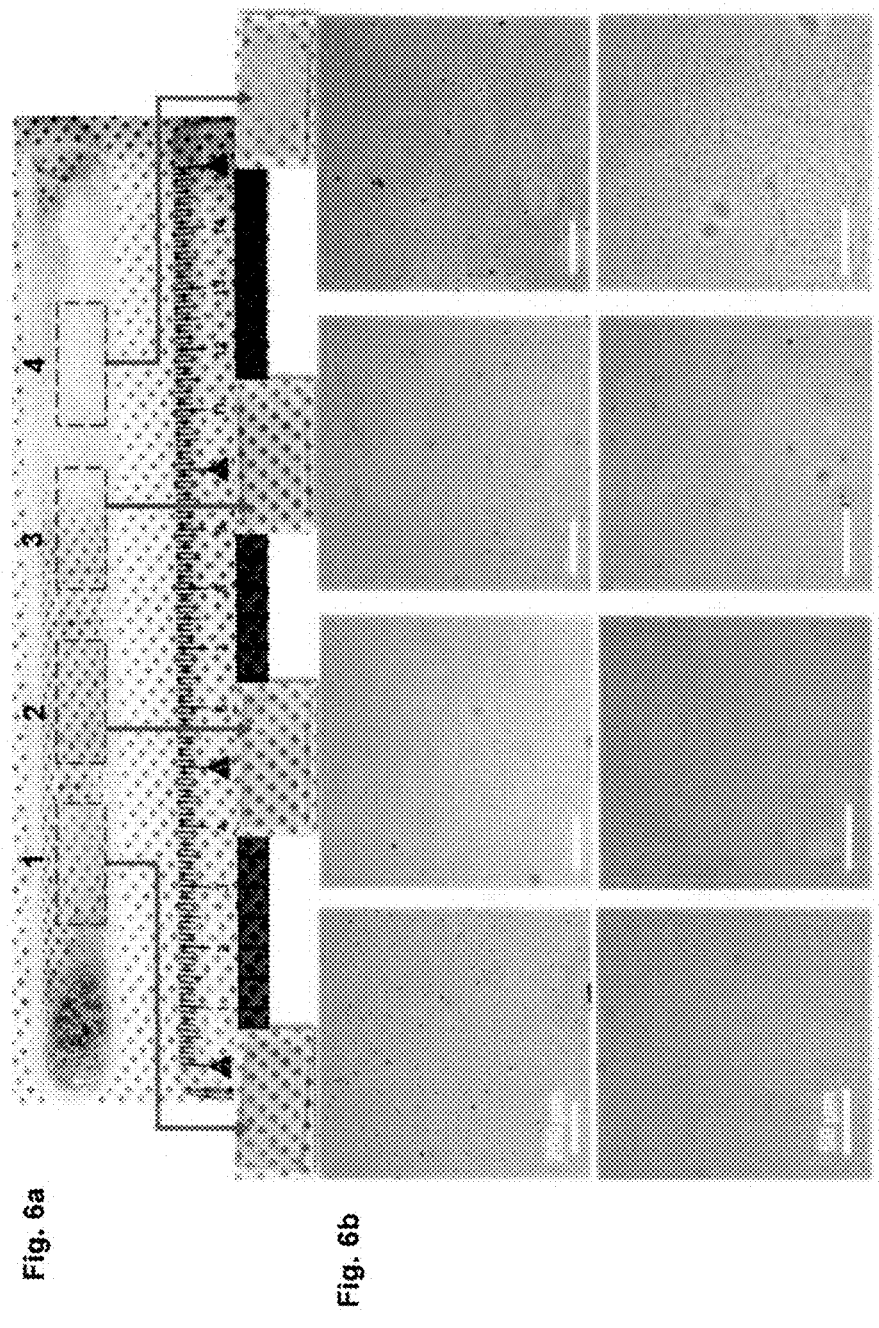

FIG. 1a illustrates, schematically, the general experimental setup. Guanidine carbonate salt ($NH_2C(=NH)$ $NH_2 \cdot \frac{1}{2}H_2CO_3$) as precursor was placed in the end of a quartz test tube. An amorphous glass substrate was positioned separately at a certain distance from the precursor so that there is provided a sufficient clearance. The substrate position was optimized to obtain the transparent uniform yellow thin film after synthesis (please also see FIGS. 6a to 6b). The test tube (reaction tube) in which the reaction took place was sealed with quartz wool and put into a tube furnace for providing heating. The quartz wool acts as a one-way valve for preventing the back flow of residue/contaminants into the test tube during synthesis. During synthesis, the tube furnace was heated at a rate of 10-20° C./min to a desired temperature ranging from 450 to 600° C. and annealed for 1-6 hours and then naturally cooled down to room temperature. Before initiating the heating process, an air flow of 100 ml/min was introduced for 15-30 minutes to eliminate the humidity in the tube furnace. This air flow was maintained constant until the synthesis was completed.

Chemical reactions in the synthesis process were characterized by thermogravimetric analysis (TGA) in FIG. 1b. The derivations of weight loss vs. temperature showed two distinguished peaks at 200° C. and 305° C. The first peak at 200° C. indicated the decomposition of guanidine carbonate into guanidium ($C(CH_2)_3+$) and carbonate ($H_2CO_3$) molecules. Additionally, the ($C(CH_2)_3+$) ions were linked together to form melamine and released ammonia ($NH_3$). When the temperature ramped above 200° C., the derivative curve fell to zero and gradually increased thereafter, indicating that the decomposition was completed. This was followed by an acceleration in the polymerization of guanidine ions to form volatile melamine as the temperature increased. The rise of derivative curve was also relevant with the increase of weight loss due to sublimation of melamine as well as $NH_3$ release. The derivation of weight loss to temperature reached the second peak at 305° C., corresponding to the maximum melamine sublimation rate.

The temperature was ramped up to 450, 500, 550 and 600° C. and held for two hours in separated synthesis experiments, before naturally cooling to room temperature (see Methods). Since the precursor decomposition was complete at 305° C., further annealing at higher temperatures was primarily employed to sublime melamine onto the downstream glass substrate and to promote the polycondensation of melamine ions into larger melem ions, which serve as the primary units of polyheptazine ($g\text{-}C_3N_4$). Finally, the transparent yellow thin film deposited on glass substrate and the yellow solid powder at the end of test tube were collected after annealing for further characterization (FIG. 1c).

The wettability of $CN_x$ thin films as well as membranes made from powder samples (see Methods and FIG. 7) were unravelled by the CA measurement with water droplet (FIGS. 21-2e). Unexpectedly, both $CN_x$ thin film and the membranes exhibited superhydrophilic behaviors. From the CA of water droplets on the surface of $CN_x$ thin films (FIGS. 2a to 2b), two groups with distinct wetting behaviors were identified. The first group comprises samples synthesized at 450 and 550° C., while the second group consists of samples synthesized at 500 and 600° C. Upon initial contact, the first group exhibited a water CA of approximately 25-30°, while the second group had a low CA of 10-15°. Two seconds after initial contact, the water droplets on the 450° C. and 550° C. films maintained a CA of approximately 15-20°, while the 500° C. and 600° C. films showed a CA with water below 10°. The different contrasts on thin film sample under optical microscope (OM) (FIG. 8) were also correlated with their wetting property. Relation between CA value and surface morphology can be described by Wenzel's equation as below:

$$\cos\theta m = R\cos\theta y \qquad (1)$$

where R is the ratio between the actual solid surface area and the nominal surface area; $\theta_y$ and $\theta_m$ are the Young contact angle and measured CA of actual solid surface with water, respectively. According to Wenzel's equation (1), an increase in surface roughness leads to an increase in chemical wettability. The difference in CA between the 600° C. and 500° C. films of 1-2° is negligible, suggesting that their surfaces had similar morphology and chemistry. Additionally, the initial CA of the 550° C. film) (28.75° was higher than that of the 450° C. film) (26.25°. After 2 seconds, the droplets on the surface stabilized, and the final CA of the 550° C. film) (15° was significantly lower than the final CA of the 450° C. film) (21.25°. This phenomenon can be explained by the relation between CA and surface porosity (fp) described by Cassie-Baxter's equation (2):

$$f_p = 1 - \left[(\cos\theta_m + 1)/(\cos\theta_y + 1)\right] \qquad (2)$$

The final variation in CA between the 450° C. and 550° C. films was attributed to the fact that the 450° C. film had a higher porosity than the 550° C. film, as evidenced by the cross-sectional scanning electron microscope (SEM) images (FIGS. 9a to 9d). The cross-sectional SEM image of the 450° C. film revealed a high level of structural porosity, and the porosity decreased as the thickness decreased by increasing the polycondensation temperature while using the same annealing time of 2 hours, which was consistent with the final CA measurement value (FIG. 2b). Next, the surfaces of $CN_x$ thin films were characterized by AFM (FIGS. 2c to d and FIGS. 10a to 10b) and the surface roughness as well as CA value of each thin film sample were summarized in Table 2. Specially, the surface of $CN_x$ thin films synthesized at 500° C. were composed of 1D needle-shaped structures. (FIGS. 2c to 2d). The 1D structure on the 2D surface greatly increased the surface roughness resulting in the enhancement of hydrophilicity according to the Wenzel's equation (1), which lined up with the smallest CA with water of the 500° C. thin films. Besides, due to the high thermal expansion of glass substrate at 600° C., the $CN_x$ thin films suffered heavy delamination from underlying substrate (FIG. 9d), preventing the accurate observation of surface and thickness. Moreover, the membranes exhibited the lowest CA with water of 0.5-1° (FIG. 2e). Although the trend of water CA with surfaces largely agreed with theories, the experimental results exceeded the calculated values. These results implied that the annealing temperature modulated the surface morphology and surface chemistry, which could collectively influence the hydrophilicity of both the CNx thin films and the powder samples. Table 1 shows a comparison of Comparison of conventional methodologies and present invention with respect to O/C ratio and CA value.

Figures 11A, 11B:
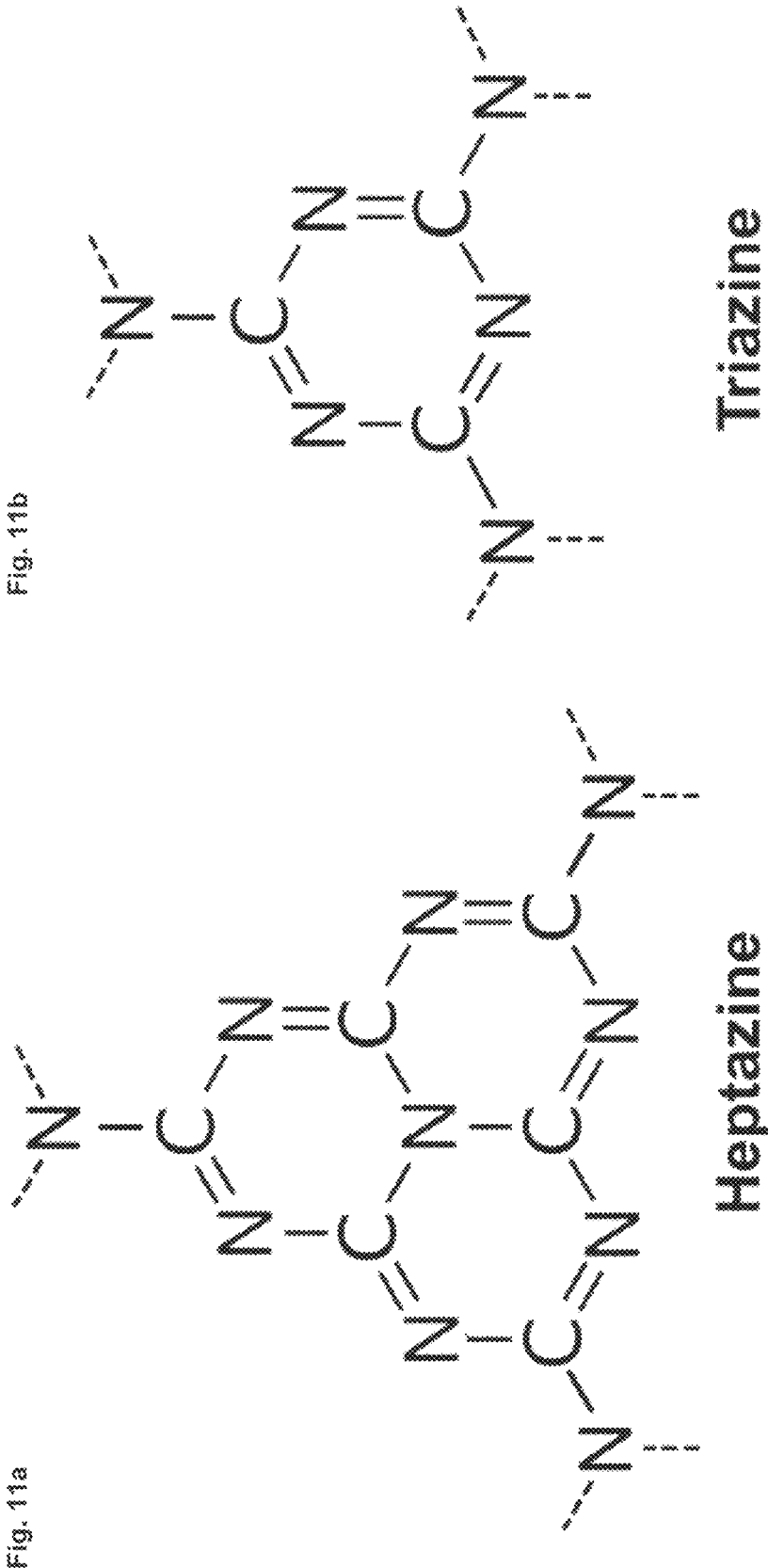

To further understand the physical structure and chemical bonding in the $CN_x$ thin films and membranes, X-ray diffraction (XRD) and Fourier-transform infrared (FT-IR) measurements were employed on both powder and thin film samples. The yellow powder samples were identified as polyheptazine g-$C_3N_4$ (FIGS. 11a to 11b), referring to the diffraction peaks at 2θ=12.8° and 27.5° (FIG. 3a), which corresponded to (100) and (002) planes of the polyheptazine layered structure, respectively. The (100) peak corresponded to in-plane distance of 0.68 nm between the neighbouring heptazine units, and the (002) peak indicated the spacing of 0.32 nm between the graphitic layers. In particular, the 450° C. powder exhibited additional peaks at 2θ=22° and 25.2°, which were attributed to the diffraction from (100) and (101) planes of triazine based g-$C_3N_4$ (FIGS. 11a to 11b). XRD analysis revealed that the g-$C_3N_4$ powder synthesized at 450° C. consisted of both triazine and heptazine phase, while the powder synthesized at higher temperature only contained the heptazine phase. This is because the heptazine networks are more stable than the triazine networks, and thus, the products formed heptazine networks at higher annealing temperatures. In contrast, the $CN_x$ films exhibited lower crystallinity in which the (002) peak of graphitic structure was barely observed under the broad diffraction peak from the amorphous glass. An additional peak at 44.1° was observed, which corresponded to the diffraction from (101) planes of graphite layered structure (FIG. 3b).

Figures 3A, 3B, 3C:
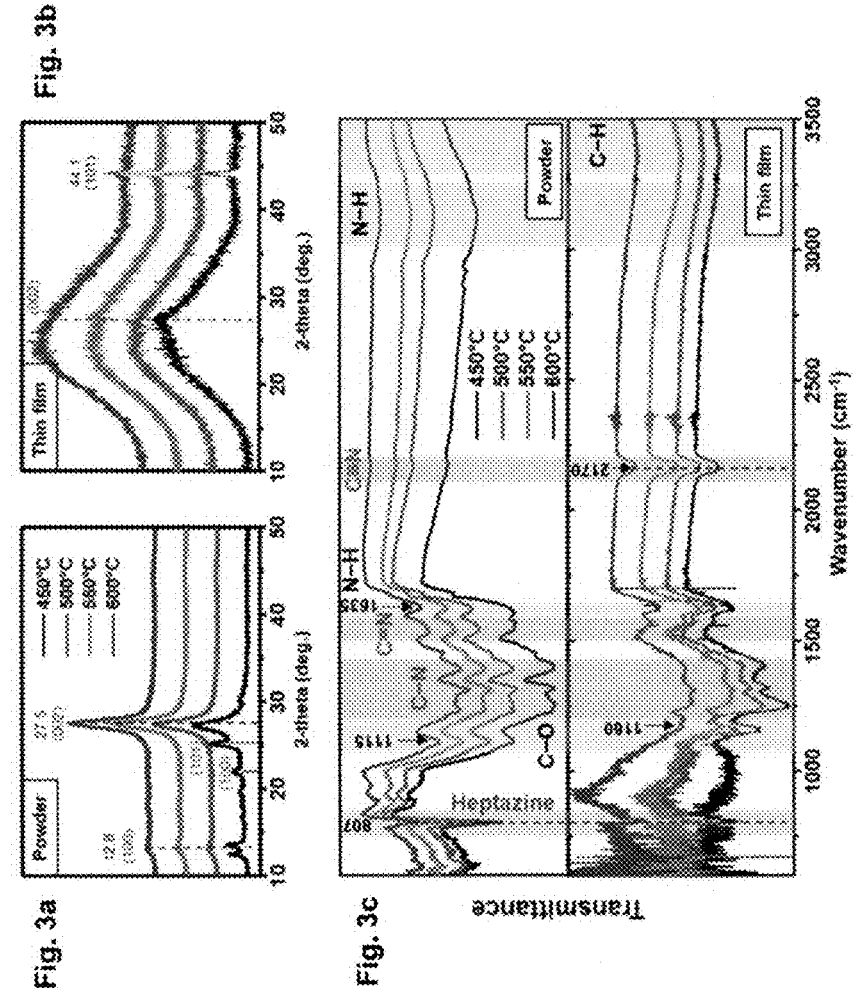

In FIG. 3c, the FT-IR result of powder and thin films samples had a distinct peak at 807 cm$^{-1}$ referring to the vibration of heptazine groups, which agreed with the XRD result. The CN hexagonal rings were represented by high-intensity multi-peak in the range of 1200-1400 cm$^{-1}$ which was correlated to the stretching of C—N and C=N bonds. The peak at 1115 cm$^{-1}$ was correlated to C—O stretching which evidenced to the presence of oxygen-based functional groups. In addition, the peak in 1635 cm$^{-1}$ was correlated with N—H bending, and the broad peak range of 3000-3300 cm$^{-1}$ was related to N—H stretching. From the FT-IR result can be seen that our direct growth samples contained sufficient O-based groups and NH groups, which mainly contributed to their superhydrophilic behavior. Notably, the co-existence of O-based groups and NH groups was rare because oxygen would react selectively with hydrogen rather than binding to the surface. This limited the proportion of O-based groups embedded to the surface. However, this limitation was absent in our synthesis because these functional groups were spontaneously implanted during the polycondensation of samples, rather than being embedded after synthesis. The chemical bonds in thin films were similar to these in powder samples except for the higher proportion of C=N bonds peaking at 2170 cm$^{-1}$, which responded to the 1D texture on $CN_x$ thin films (FIGS. 2c to 2d). Moreover, the large amount of functional groups implanted also caused corrugation to the surface itself.

Figure 4:
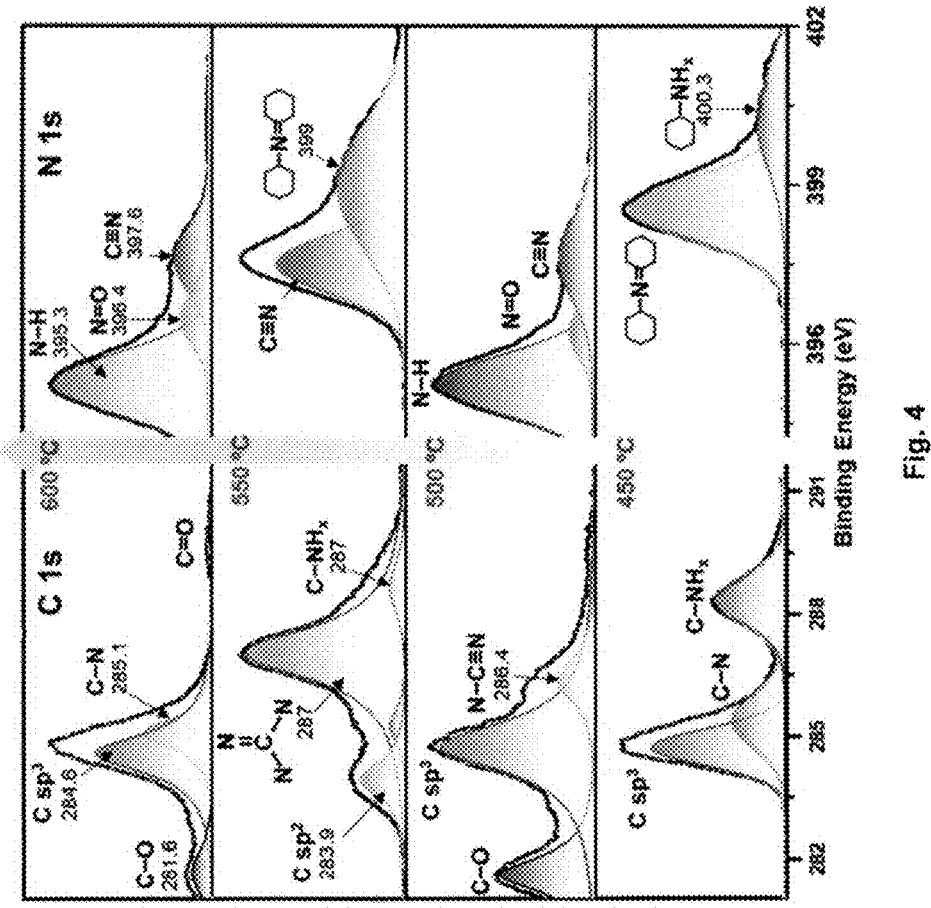

FIG. 4 displays the X-ray photoelectron spectroscopy (XPS) characterization for the chemical bonds on surface of $CN_x$ thin films. The highest peak of C 1s core-level in 600° C., 500° C. and 450° C. thin films was centered at 284.7 eV with the half-maximum full width of 1.5 eV, corresponding to the tetrahedral C—C sp3 bonding. In contrast, the 550° C. thin film exhibited the peak of C—C bonding in at 283.9 eV, which was equivalent to the planar-triangle $sp^2$ bonding. The peak at 287 eV indicated that the $sp^2$ C atom was coordinated with three N atoms, forming the main bonding in polyheptazine graphitic structure. The lower number of N atoms coordination presented in 600° C., 500° C., and 450° C. thin films, contributed to the peak at 285.4 eV, which corresponded to the (C—N) bonding. Especially, the 500° C. thin film contained a significant amount of (C=N) bonding, which was assigned to the peak at 286.4 eV and consistent with its 1D texture (FIGS. 2c to 2d). These findings can be elucidated by the thermal effects on the equilibrium between decomposition and polycondensation. The polycondensation of 2D layered structure was enhanced at temperature of 550° C., while higher or lower temperatures led to dominant decomposition into 3D tetrahedral carbon.

In particular, the superhydrophilic thin films deposited at 600° C. and 500° C. contained C—O bonds, indicated by the peak at 281 eV, and the peak at 395 eV was assigned to the N—H bond energy in ($NH_4$+) groups. In contrast, 550° C. and 450° C. thin films presented only bonds between C atoms in CN hexagonal rings with amine groups ($NH_x$, x=1, 2), as well as bonds between N and H in $NH_x$, corresponding to the peaks at 288.5 eV and 400 eV, respectively. This observation further supported the conclusion that O-based and $NH_x$ functional groups co-existed in the $CN_x$ thin films, and that the superhydrophilicity was mainly contributed by the rich O-based functional groups embedded on thin films deposited at 500° C. and 600° C.

Figures 7A, 7B, 7C, 7D, 7E:
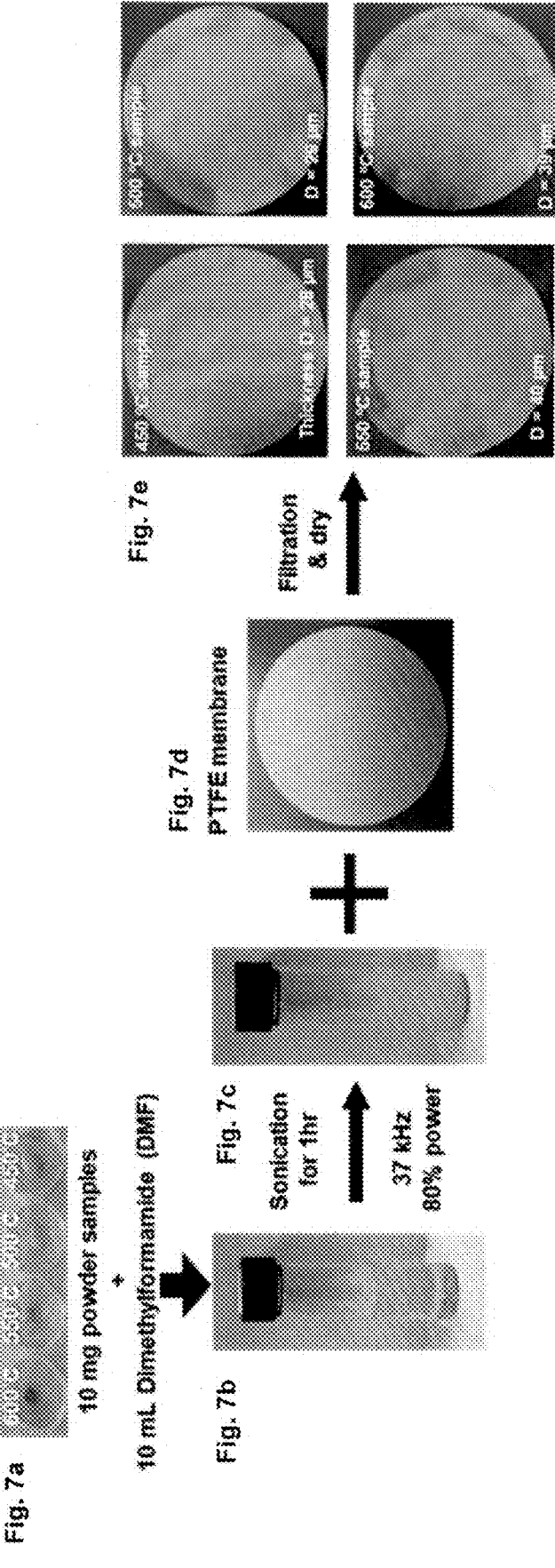
Figure 8:
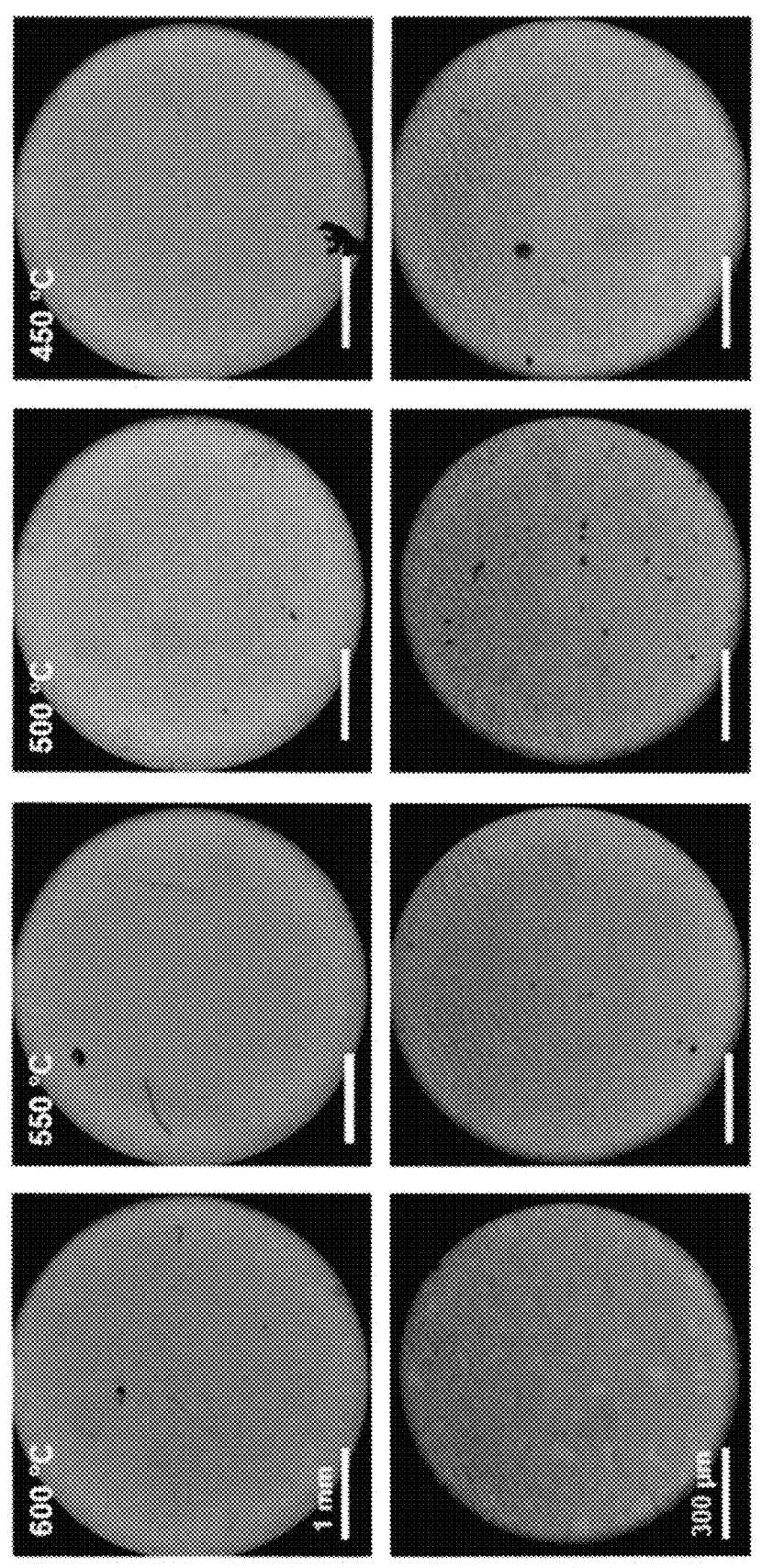
FIG. 8 are backlight OM images showing the comparison of $CN_x$ thin films deposited at different annealing temperatures.
Figures 10A, 10B:
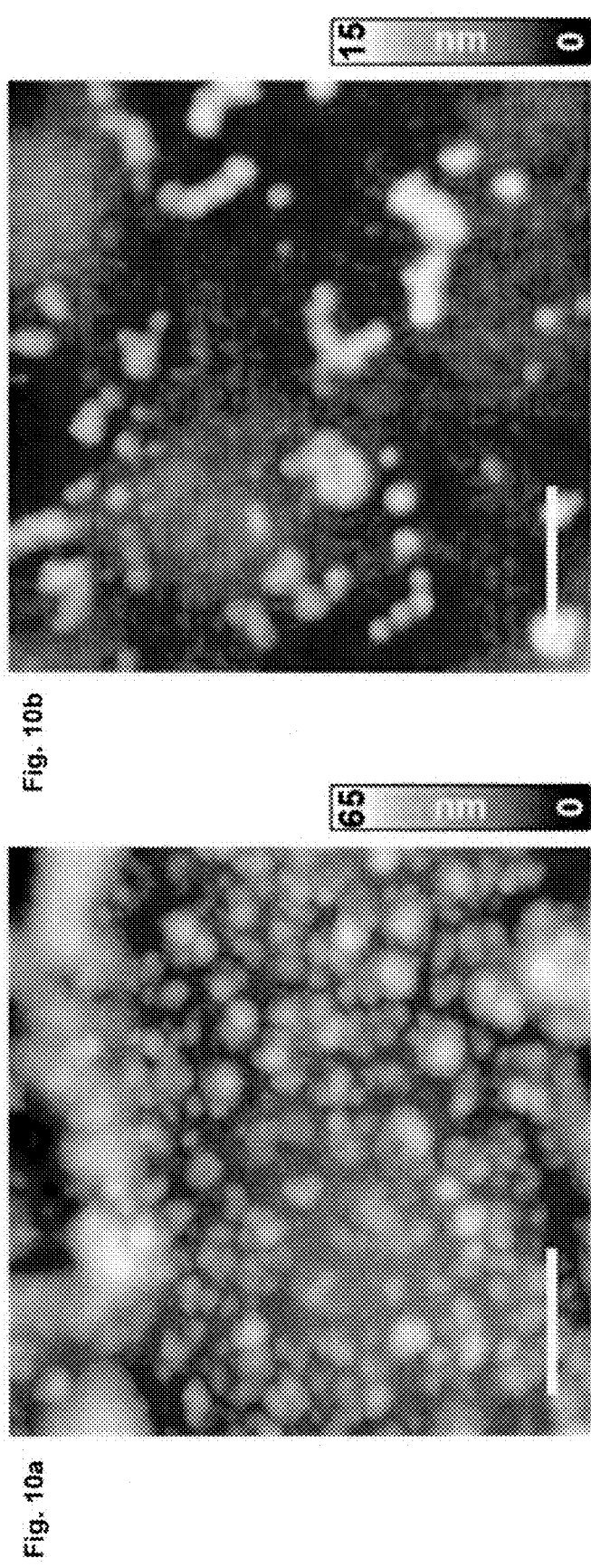
FIGS. 10a to 10b are atomic microscope (AFM) topographic images of the $CN_x$ thin films deposited at 450 and 550° C., respectively [scale bar 500 nm].

For comparison, the XPS results of $g$-$C_3N_4$ powder samples were provided in FIG. 12. Unlike thin films, the powder products were located at the higher temperature position in the CVD synthesis process (see FIG. 1a). The higher thermal energy in polycondensation of powder promoted a stronger polymeric binding, as evidenced by the dominance of σ bonds between C atom with one (285.8 eV) or three (286.9 eV) N atoms in the graphitic structure. In contrast, at the lower annealed temperature like 450° C., the decomposition reaction of precursor was slower and the polymerization of abundant melamine in precursor was not totally completed, as evidenced by the lighter yellow colour of powder sample (FIG. 7a). The conjugated bonds in CN hexagonal rings were determined by the peaks at 401.7 eV and 402.7 eV. Moreover, the functional groups were demonstrated by the peak of C=O (290 eV), N—H in the amines (400 eV) and N—O in the nitrates (403-405 eV). All the $g$-$C_3N_4$ powder samples contained large O-based functional groups, which was directly relevant to the superhydrophilic membranes made from powder samples. The variety of functional groups in both thin films and powder samples resulted from the multi-elemental dry air flow during annealing process. The constant flow partially removed $NH_3$ gas, which was released from decomposition of precursor, and maintained a constant ratio of $N_2$, $O_2$, $CO_2$ and Ar during the polycondensation of $CN_x$ thin films and $g$-$C_3N_4$ powder. Therefore, the different functional groups implanted to surface can be simply controlled by temperature without affecting intrinsic optical properties of $g$-$C_3N_4$ structure (FIG. 13) except their morphologies. The thin film synthesized at 500° C. and 600° C. showed their surface roughness increase (FIGS. 14a to 14d) that agreed with their chemical hydrophilicity increase (see FIG. 2b).

The atomic percentage (at %) of carbon (C), nitrogen (N) and oxygen (O) in $CN_x$ thin films were strongly influenced by annealing temperature (Table 3). Overall, the N at % increased proportionally with annealing temperature, while the O at % decreased, and the C at % approximately maintained at 42%, except for the 450° C. thin film. The low N at % of 450° C. thin film was due to the low thermal energy, where the decomposition reaction was stronger than polymerization, as in above-mentioned TGA result. The superhydrophilic 500° C. thin film had high O concentration contributed by rich O-based functional groups (=O, —OH and —$NO_x$). Meanwhile, the C/N ratio in 550 and 600° C. thin films were similar to the $g$-$C_3N_4$ powder. On the other hand, annealing temperature was less effective in controlling the at % in $g$-$C_3N_4$ powder (Table 4). The graphitic powder has C/N ratio of 1.05-1.15 with small amount of oxygen intercalation (4.84-7.39 at %).

The wettability of $CN_x$ thin films was highly consistent with their chemical bonding. The superhydrophilicity in 600° C. and 500° C. thin films were associated with the rich O-based functional groups (indicated by C—O and C=O bonds) on the surface, resulting high attraction to water molecules. Meanwhile, the 550° C. is the ideal temperature for the polycondensation of heptazine structure, and 450° C. is for the combined structure of triazine and heptazine (See FIGS. 3a to 3b). The well-established structure of 450° C. and 550° C. samples had fewer active sites to attach O-based functional groups except the $NH_x$ groups which persisted in melamine. In contrast, the sample synthesized at 500° C. was in the intermediate state of transforming triazine to heptazine, and sample synthesized at 600° C. started decomposing heptazine to tetrahedral carbon, therefore, they had high level of defect/active sites for O-based functional groups embedding. Moreover, the 1D texture on 2D surface of 500° C. thin film was relevant to the abundance of CEN bonds which contributed to the 1D structure alignment (FIGS. 2c to 2d) which significantly increase its chemical wettability as well. Further, the superhydrophilicity of the $g$-$C_3N_4$ membranes was subjected to C=O groups in powder samples, according to FT-IR and XPS results (FIG. 3c and FIG. 4). Apart from that, CA of 450° C., 500° C. and 600° C. $g$-$C_3N_4$ membranes with water degraded to nearly 0° within 2 secs, meanwhile the CA of 550° C. membrane made a quick drop from 30° to 6°. The differences were related to the appearance of $NO_x$ and OH functional groups in the powder formed at 450° C., 500° C. and 600° C., instead, the $NH_x$ groups in 550° C. membrane (FIG. 12) had lower polarization toward the hydrogen bonding with water molecules than the $NO_x$ and OH groups.

Superhydrophilicity can benefit the photoelectrocatalytic performance by increasing ion transfer and gas separation. In addition, the superhydrophilicity can be further enhanced under light irradiation (FIG. 15). The HER performance of superhydrophilic $CN_x$ thin film directly deposited on carbon cloth ($CN_x$@CC) was examined through linear sweep voltammetry (FIG. 5a) under 15 W Xenon arc lamb irradiation (see Methods). The $CN_x$@CC showed an overpotential of 373.7 mV and a Tafel slope of 177.59 mA dec-1 under dark condition (FIG. 5b). Noted that $CN_x$ is an important photocatalysts with a narrow bandgap, its activity great improved under light irradiation with a reduced overpotential of 130.1 mV and a lower Tafel slope of 75.07 mA dec-1, surpassing that the values in previous work. The electrochemical impedance spectroscopy (FIG. 5c) revealed the electron transfer kinetics of the electrode, low ohmic resistances were realized under both dark and light condition, which was ascribed to the superhydrophilic of the synthesized $CN_x$. Besides, the superhydrophilic surface reduces the bubbles size and promotes the detachment of bubbles from the electrode. FIG. 5*d* shows that $H_2$ bubbles generated on the electrode are small and can be released quickly, which effectively avoided dead surface area and increased current density. To investigate the relationship between hydrophilicity and photoelectrochemical performance, the electrocatalytic performance of $CN_x@CC$ grown under different synthesis temperature is tested and provided in FIGS. 16*a* to 16*b*. The 450° C. $CN_x@CC$ shows a lowest overpotential of 277.0 mV under light condition, correspondingly, it has the worst hydrophilicity, as depicted in FIGS. 2*a* to 2*b*. With the increase of hydrophilicity, the photocatalytic performance was improved. It is evidenced that the superhydrophilicity of catalyst is feasible for the improvement of the HER performance.

Methods

Samples Preparation-Synthesis of Carbon Nitrides

About 0.6 g of guanidine carbonate (linear formula $NH_2C$ (=NH) $NH_2 \cdot \frac{1}{2}H_2CO_3$, 99%, Merck 593-85-1) was placed at the end of a quartz test tube (length: 155 mm, diameter: 12 mm). A glass microscope slide or carbon cloth (CC) was positioned 1 cm away from the guanidine carbonate. The test tube was sealed with quartz wool and put into a tube furnace nameplated STF 15/180. The furnace was heated up at the speed of 10° C./min from room temperature to the desired temperature and annealed for 2 hours afterwards. The dry air flow (78.09% nitrogen, 20.95% oxygen, 0.93% argon, 0.04% carbon dioxide) of 100 ml/min was supplied constantly from 30 minutes before the heating process until the end of synthesis process.

Samples Preparation-Preparation of Graphitic Carbon Nitride (g-$C_3N_4$) Membrane About 10 mg of g-$C_3N_4$ powder dispersed in 10 ml of dimethylformamide (DMF) solvent (99.8%, Merck 68-12-2) was placed into ultrasonic bath for an hour (37 kHz, 80% power) before being filtrated on hydrophilic polytetrafluoroethylene (PTFE) membrane with pore size of 0.1 μm to form g-$C_3N_4$ membranes (see FIGS. 7*a* to 7*e*).

Characterization Techniques-Thermogravimetric Analysis (TGA)

The TGA measurement was carried out using the Thermogravimetric Analyser (TA Instruments Q500). About 15 mg of guanidine carbonate salt was put to an alumina pan hanging in the TGA chamber. A dry air flow of 20 ml/min was supplied to the TGA chamber in whole measuring process to imitate the synthesis conditions. At first the chamber was equilibrated at 100° C. for 30 min to remove humid absorption. Then the chamber was ramping up of 10° C./min to 600° C. and isothermal for 30 min before naturally cooling down to room temperature.

Characterization Techniques-Contact Angle Measurements

The wetting behaviors of the samples were examined by contact angle (CA) measurement, using sessile drop technique (Drop shape analyser DSA25S, KRÜSS GmbH, Germany). It was performed under ambient conditions (20° C. in temperature, 50% in humidity). A water droplet of 1-5 μl was deposited on a substrate and CA was measured within two seconds. The CA analysis from the recorded videos was processed by the software of ImageJ.

Characterization Techniques-X-ray Diffraction (XRD)

XRD results of thin films and powder were carried out by the Smartlab X-ray diffractometer (RIGAKU, Japan), which scanned over the sample in the 2θ range of 10-60°, with the resolution of 0.02°.

Characterization Techniques-Fourier Transform Infrared Spectroscopy (FT-IR)

FTIR spectra of sample were recorded using FT/IR-4700 (JASCO, Japan) spectrophotometer, which scanned over the wavenumber range of 600-4000 $cm^{-1}$, with resolution of 1 $cm^{-1}$ in the transmittance mode.

Characterization Techniques-X-Ray Photoelectron Spectroscope (XPS)

XPS was applied to measure the chemical binding energy as well as the atomic ratio (at %) using an Al X-ray source (Thermo-Scientific, ESCALAB 250Xi). All the peaks were measured under high vacuum (10-8 Torr). The raw XPS data has been corrected using Shirley method to subtract signal from the inelastic scattering of electrons before analysis (See FIG. 15).

Characterization Techniques-Scanning Electron Microscope (SEM)

SEM (Philips FEG SEM XL30, USA) was used to examine the cross-section morphology of the thin film. High-level resolution at different magnifications is obtain by operating at different accelerating voltages.

Characterization Techniques-Atomic Force Microscope (AFM)

AFM measurement was carried out using AFM5300E system (Hitachi, Japan). The tapping mode was applied for observation of the topography, using a gold-coated Si cantilever (NSG30, Nanotips, f=340 KHz, C=1 N/m).

Characterization Techniques-Photoelectrochemical measurement

The photoelectrochemical measurements were performed by a three-electrode system in 0.5 M $H_2SO4$ electrolyte. The in-situ grown $CN_x@CC$ is used as the work electrode, Ag/AgCl and Pt are acted as the reference and counter electrode, respectively. The HER performance was tested by linear sweep voltammetry (LSV, 10 mV s–1) and electrochemical impedance spectroscopy (EIS) on CHI760E electrochemical workstation. Photocurrents were obtained using a 300W Xenon arc lamp under an output power of 15 W. All the polarization curves were obtained without IR correction.

CONCLUSIONS

The present invention has demonstrated the synthesis of superhydrophilic $CN_x$ thin films and g-$C_3N_4$ membranes using direct CVD method. The superhydrophilicity of our products breaks the previous limitation of the as-grown $CN_x$ products. The effect of different temperature conditions on the thermal polycondensation of $CN_x$ in dry air medium has been revealed, suggesting the dominant incorporation of O-based or N-based functional groups can be spontaneously achieved by CVD annealing, followed by the relative change in chemical wettability. Moreover, enriched functional groups as well as (C=N) bonds collectively promoted the formation of 1D texture that greatly enhanced the surface area and porosity of $CN_x$ thin films. The superhydrophilic $CN_x$ thin films and the g-$C_3N_4$ powder are ideal candidates for a variety of applications working in water/humid environments.

Superhydrophilicity benefits many applications working in the water/humid-involved environments, from the self-cleaning outdoor window surfaces, to the high performance photocatalysts and membranes in various studies. The contribution of superhydrophilicity to the surface applications can be categorized into two factors: first, by increasing the attraction to water molecules which directly speed up the water splitting reactions or water transportation through the membrane; second, by self-cleaning effect preventing the contaminations of catalytic surface or/and fouling effect on the membrane applications. Therefore, the present invention of increasing hydrophilicity without interfering their intrinsic properties of target materials is advantageous to many applications.

Specifically, the present invention has contributed to a new method for direct synthesis of the superhydrophilic $CN_x$ thin films on hydrophobic substrate and highly crystalline superhydrophilic powder of g-$C_3N_4$ using the chemical vapor deposition (CVD). The CA with water of the $CN_x$ thin films and the membranes made from g-$C_3N_4$ powder reaches below 5°, which is inaccessible via direct growth before. In addition, different surface textures and water wettability could be tuned by controlling the thermal condensation temperature of 450° C. to 600° C. The new superhydrophilic $CN_x$ structure has shown their potential as metal-free photocatalyst for hydrogen evolution reaction (HER).

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. For example, one application of the present invention is the provision of superhydrophilic $CN_x$ thin film which can be used as metal-free photocatalyst for hydrogen evolution reaction (HER). The superhydrophilic $CN_x$ thin films and powder has potential to be applied as coating for example on smart windows which have both self-cleaning and photocatalytic properties.

TABLE 1

Comparison of conventional methodologies and present invention with respect to O/C ratio and CA value

| Conventional methods | O/C ratio | CA value (deg.) |
| --- | --- | --- |
| Plasma-enhanced chemical vapor deposition | 0.34 | 81.9 |
| (S.A. Almad Kamal et. al. Applied Surface | 0.39 | 103.9 |
| Science 328 (2015) 146-153) | 0.44 | 120.8 |
| | 0.08 | 156.6 |
| Plasma-enhanced pulsed laser deposition | ~0 | 66-77 |
| (M.E. Ransey et. al. Thin Solid Films | | |
| 360 (2000) 82-88) | | |
| Present invention | 0.01-0.63 | 0-5 |

TABLE 2

Surface roughness and contact angle with water of $CN_x$ then films deposited at different annealing temperature

| Thin films surface | 450° C. | 550° C. | 450° C. | 450° C. |
| --- | --- | --- | --- | --- |
| AFM Roughness (RMS) | 10.4 | 4.3 | 2.5 | — |
| Contact angle (°) 0 sec | 26.25 | 12.75 | 28.75 | 15.5 |
| $1^{st}$ sec | 22 | 8.25 | 19 | 8.5 |
| $2^{nd}$ sec | 21.25 | 6.75 | 15 | 5.5 |

TABLE 3

Elemental atomic ration of g-$C_3N_4$ powder synthesized at different annealing temperatures

| | Synthesis temperature | | | |
| --- | --- | --- | --- | --- |
| Element | 600° C. | 550° C. | 500° C. | 450° C. |
| C (at %) | 48.69 | 49.30 | 48.65 | 50.9 |
| N (at %) | 45.17 | 43.30 | 46.22 | 44.26 |
| O (at %) | 6.14 | 7.39 | 5.14 | 4.84 |
| C/N ratio | 1.08 | 1.14 | 1.05 | 1.15 |

TABLE 4

Ratio of thin film carbon/nitrogen atom (C/N) of samples/ embodiments from experiments leading to present invention

| Samples | C/N ratio |
| --- | --- |
| 1. $CN_x$ film on glass | 1.04 |
| 2. $CN_x$ film on FTO glass | 0.86 |
| 3. CNx film on carbon cloth | 0.92 |
| 4. g-$C_3N_4$ membrane on PTFE membrane | 1.05 |

The following references are incorporated in their entirety and a skilled person is considered to be aware of disclosure of these references.

X. C. Wang, K. Maeda, A. Thomas, K. Takanabe, G. Xin, J. M. Carlsson, K. Domen. M. Antonietti. Nat. Mater. 2009, 8 (1), 76-80.

L. H. Lin, Z. Y. Lin, J. Zhang, X. Cai, W. Lin, Z. Y. Yu. X. C. Wang. Nat. Catal. 2020, 3 (8), 649-655.

J. Liu, H. Q. Wang. M. Antonietti. Chem. Soc. Rev. 2016, 45 (8), 2308-2326.

P. Wen, P. W. Gong, J. F. Sun, J. Q. Wang. S. R. Yang. J. Mater. Chem. A 2015, 3 (26), 13874-13883.

B. D. Boruah, A. Mathieson, B. Wen, C. S. Jo, F. Deschler. M. De Volder. Nano Lett. 2020, 20 (8), 5967-5974.

F. Foglia, A. J. Clancy, J. Berry-Gair, K. Lisowska, M. C. Wilding, T. M. Suter, T. S. Miller, K. Smith, F. Demmel, M. Appel, V. G. Sakai, A. Sella, C. A. Howard, M. Tyagi, F. Cora. P. F. McMillan. Sci. Adv. 2020, 6 (39).

R. Li, Y. L. Ren, P. X. Zhao, J. Wang, J. D. Liu. Y. T. Zhang. J. Hazard Mater. 2019, 365, 606-614.

X. C. Wang, X. F. Chen, A. Thomas, X. Z. Fu. M. Antonietti. Adv. Mater. 2009, 21 (16), 1609-1612.

V. Ragupathi, P. Panigrahi. N. G. Subramaniam. Optik 2020, 202.

S. Y. Qi, X. K. Ma, B. Yang, L. Sun, W. F. Li. M. W. Zhao. Carbon 2019, 149, 234-241.

M. Y. Huang, H. P. Wang, W. Li, Y. L. Zhao. R. Q. Zhang. J. Mater. Chem. A 2020, 8 (45), 24005-24012.

N. H. Khanis, R. Ritikos, S. A. Ahmad Kamal. S. Abdul Rahman. Materials 2017, 10 (2).

Y. Y. Bu, Z. Y. Chen. W. B. Li. Appl. Catal. B-Environ. 2014, 144, 622-630.

M. J. Liu, S. T. Wang. L. Jiang. Nat. Rev. Mater. 2017, 2 (7).

J. Son, S. Kundu, L. K. Verma, M. Sakhuja, A. J. Danner, C. S. Bhatia. H. Yang. Sol. Energ. Mat. Sol. C 2012, 98, 46-51.

K. Huang, P. Rowe, C. Chi, V. Sreepal, T. Bohn, K. G. Zhou, Y. Su, E. Prestat, P. B. Pillai, C. T. Cherian, A. Michaelides. R. R. Nair. Nat. Commun. 2020, 11 (1).

S. J. Maguire-Boyle, J. E. Huseman, T. J. Ainscough, D. L. Oatley-Radcliffe, A. A. Alabdulkarem, S. F. Al-Mojil. A. R. Barron. Sci Rep-Uk 2017, 7.

15

B. J. Cha, S. Saqlain, H. O. Seo. Y. D. Kim. Appl. Surf. Sci. 2019, 479, 31-38.

S. H. Park, S. Y. Byeon, J.-H. Park. C. Kim. ACS Energy Lett. 2021, 6 (9), 3078-3085.

D. Kim, X. Qin, B. Yan. Y. Piao. Chem. Eng. J. 2021, 408, 127331.

H. Geng, H. Y. Bai, Y. Y. Fan, S. Y. Wang, T. Ba, C. M. Yu, M. Y. Cao. L. Jiang. Mater. Horiz. 2018, 5 (2), 303-308.

J. F. Zang, S. Ryu, N. Pugno, Q. M. Wang, Q. Tu, M. J. Buehler. X. H. Zhao. Nat. Mater. 2013, 12 (4), 321-325. DOI 10.1038/Nmat3542.

Y. P. Chen, J. Y. Cai, P. Li, G. Q. Zhao, G. M. Wang, Y. Z. Jiang, J. Chen, S. X. Dou, H. G. Pan. W. P. Sun. Nano Lett. 2020, 20 (9), 6807-6814.

S. A. A. Kamal, R. Ritikos. S. A. Rahman. Appl. Surf. Sci. 2015, 328, 146-153.

M. E. Ramsey, E. Poindexter, J. S. Pelt, J. Marin. S. M. Durbin. Thin Solid Films 2000, 360 (1-2), 82-88.

Y. Wang, N. N. Wu, Y. Wang, H. Ma, J. X. Zhang, L. L. Xu, M. K. Albolkany. B. Liu. Nat. Commun. 2019, 10.

J. Kouvetakis, A. Bandari, M. Todd, B. Wilkens. N. Cave. Chem. Mater. 1994, 6 (6), 811-814.

B. Jurgens, E. Irran, J. Senker, P. Kroll, H. Muller. W. Schnick. J. Am. Chem. Soc. 2003, 125 (34), 10288-10300.

L. S. Rangel, J. R. de la Rosa, C. J. L. Ortiz. M. J. Castaldi. J. Anal. Appl. Pyrolysis 2015, 113, 564-574.

R. N. Wenzel. Ind. Eng. Chem. Res. 1936, 28 (8), 988-994.

M. A. Rodriguez-Valverde, F. J. M. Ruiz-Cabello, P. M. Gea-Jodar, H. Kamusewitz. M. A. Cabrerizo-Vilchez. Colloids Surf., A Physicochem. Eng. Asp. 2010, 365 (1-3), 21-27.

A. B. D. Cassie. S. Baxter. J. Chem. Soc., Faraday trans. 1944, 40 (0), 546-551. DOI 10.1039/TF9444000546.

F. Fina, S. K. Callear, G. M. Carins. J. T. S. Irvine. Chem. Mater. 2015, 27 (7), 2612-2618.

E. Kroke, M. Schwarz, E. Horath-Bordon, P. Kroll, B. Noll. A. D. Norman. New J. Chem. 2002, 26 (5), 508-512.

O. Bayindir, I. H. Sohel, M. Erol, O. Duygulu. M. N. Ate. ACS Appl. Mater. Inter. 2022, 14 (1), 891-899.

C. F. Huang, Y. P. Wen, J. Ma, D. D. Dong, Y. F. Shen, S. Q. Liu, H. B. Ma. Y. J. Zhang. Nat. Commun. 2021, 12 (1).

S. K. Deng, D. Rhee, W. K. Lee, S. W. Che, B. Keisham, V. Berry. T. W. Odom. Nano Lett. 2019, 19 (8), 5640-5646.

Y. Zhou, B. Wang, X. Song, E. Li, G. Li, S. Zhao. H. Yan. Appl. Surf. Sci. 2006, 253 (5), 2690-2694.

C. Ronning, H. Feldermann, R. Merk, H. Hofsass, P. Reinke. J. U. Thiele. Phys. Rev. B 1998, 58 (4), 2207-2215.

Y. Zhao, F. Zhao, X. Wang, C. Xu, Z. Zhang, G. Shi. L. Qu. Angew. Chem. Int. Ed. 2014, 53 (50), 13934-13939.

S. Shinde, A. Sami. J.-H. Lee. J. Mater. Chem. A 2015, 3 (24), 12810-12819.

N. Güy. Appl. Surf. Sci. 2020, 522, 146442.

B. K. Kim, M. J. Kim, J. J. Kim. ACS Appl. Mater. Interfaces 2021, 13 (10), 11940-11947.

D. A. Shirley. Phys. Rev. B 1972, 5, 4709

What is claimed is:

1. A method of direct synthesis of co-products of at least a first co-product and a second co-product, wherein the first co-product is superhydrophilic carbon nitride thin film with a water contact angle of 0-5° and the second co-product is superhydrophilic carbon nitride powder, comprising the steps of:

placing a precursor material on one end of a container, wherein the precursor material is a guanidine, placing a glass substrate in the container, wherein the glass substrate is positioned away from the precursor material such that there is a clearance between the precursor material and the glass substrate, placing the container in a furnace and subjecting the precursor material to heating, and allowing the first co-product to form on the glass substrate and the second co-product to form at the other end of the container.

2. A method as claimed in claim 1, wherein the superhydrophilic carbon nitride thin film has a chemical formula of $CN_x$, and the superhydrophilic carbon nitride powder has a chemical formula of $g-C_3N_4$, wherein x is 0.86-1.04.

3. A method as claimed in claim 1, wherein the water contact angle is 4.5°.

4. A method as claimed in claim 1, wherein the superhydrophilic carbon nitride thin film on its surface has an oxygen-carbon ratio of 0.01-0.63.

5. A method as claimed in claim 4, wherein the superhydrophilic carbon nitride thin film on its surface has an oxygen-carbon ratio of 0.63.

6. A method as claimed in claim 1, wherein the guanidine carbonate salt has a chemical formula of $NH_2C(\text{=}NH)NH_2 \cdot \frac{1}{2}H_2CO_3$.

7. A method as claimed in claim 1, comprising a step of subjecting the precursor material in the container to chemical vapor deposition (CVD).

8. A method as claimed in claim 1, comprising the steps of:

providing a reaction tube acting as a reaction chamber defining opposite open lateral ends, with one end receiving a flow of gas and the opposite end allowing, after reaction, the flow of gas to exit, wherein the opposite end is filled with a one-way valve for preventing backflow, placing a predetermined amount of the guanidine carbonate salt on the bottom of the reaction tube, providing a growth substrate and putting the growth substrate in the reaction tube such that there is a clearance of 1-5 cm between the growth substrate and the guanidine carbonate salt, subjecting the reaction chamber to heat in a furnace, subjecting the reaction chamber to the flow of gas therethrough and allowing the reaction to take place for a predetermined amount of time at a predetermined temperature, and allowing annealing to complete and collecting the first co-product superhydrophilic carbon nitride thin film on the growth substrate and the second co-product superhydrophilic carbon nitride powder at the opposite end of the reaction tube.

9. A method as claimed in claim 8, wherein the flow of gas is dry and consists of nitrogen, oxygen, argon and carbon dioxide.

10. A method as claimed in claim 8, wherein reaction tube has a diameter tube of 8-15 cm.

11. A method as claimed in claim 8, wherein the amount of guanidine carbonate salt placed in the reaction tube is 0.5 g to 1.5 g.

12. A method as claimed in claim 8, wherein the guanidine carbonate salt is located in the center of the heating zone of the furnace, and the growth substrate is located downstream of the heating zone in the reactive tube.

13. A method as claimed in claim 8, wherein the flow of gas has a rate in the range of 50 sccm to 200 sccm.

14. A method as claimed in claim 8, wherein the reaction takes place with an initial ramping time of 30 to 60 min, following by a subsequent annealing time of 1 to 6 hrs at 450-600° C.

15. A combination of a first co-product of superhydrophilic carbon nitride thin film and a second co-product of superhydrophilic carbon nitride powder, wherein the superhydrophilic carbon nitride thin film has chemical formula of $CN_x$, wherein x is 0.86-1.04, and the superhydrophilic carbon nitride powder has a chemical formula of $g\text{-}C_3N_4$.

16. Carbon nitride co-products as claimed in claim 15, wherein the superhydrophilic carbon nitride thin film has a water contact angle of 0-5°.

17. Carbon nitride co-products as claimed in claim 16, wherein the water contact angle of 4.5°.

18. Carbon nitride co-products as claimed in claim 15, wherein the superhydrophilic carbon nitride thin film on its surface has an oxygen-carbon ratio of 0.01-0.63.

19. Carbon nitride co-products as claimed in claim 18, wherein oxygen-carbon ratio is 0.63.

\* \* \* \* \*